(12) United States Patent
Kuznicki et al.

(10) Patent No.: US 7,055,112 B2
(45) Date of Patent: May 30, 2006

(54) METHOD FOR AUTOMATICALLY DEFINING A PART MODEL FOR SEMICONDUCTOR COMPONENTS

(75) Inventors: Steven Kuznicki, Northville, MI (US); Deepak Badoni, Ann Arbor, MI (US); Jill Goldberg, Milan, MI (US); Peter Jensen, Ann Arbor, MI (US); Bruce Ball, Whitmore Lake, MI (US)

(73) Assignee: Electro Scientific Industries, Inc., Portland, OR (US)

( * ) Notice: Subject to any disclaimer, the term of this patent is extended or adjusted under 35 U.S.C. 154(b) by 393 days.

(21) Appl. No.: 10/330,891

(22) Filed: Dec. 27, 2002

(65) Prior Publication Data

US 2003/0151054 A1  Aug. 14, 2003

Related U.S. Application Data

(60) Provisional application No. 60/344,064, filed on Dec. 28, 2001.

(51) Int. Cl.
*G06F 17/15* (2006.01)

(52) U.S. Cl. .................... 716/1; 716/4; 716/11

(58) Field of Classification Search .............. 716/1, 716/11, 4; 715/764; 356/601
See application file for complete search history.

(56) References Cited

U.S. PATENT DOCUMENTS

| | | | |
|---|---|---|---|
| 6,115,042 A * | 9/2000 | Li et al. ................ 715/764 |
| 6,141,009 A | 10/2000 | Li et al. |
| 6,151,406 A | 11/2000 | Chang et al. |
| 6,173,070 B1 | 1/2001 | Michael et al. |
| 6,501,554 B1 * | 12/2002 | Hackney et al. .......... 356/601 |

\* cited by examiner

*Primary Examiner*—Thuan Do
(74) *Attorney, Agent, or Firm*—Young & Basile

(57) ABSTRACT

The present invention provides a method for automatically defining a part model for a semiconductor component. An image of the component is provided. The automatic method may be any of a trial and error method, systematic method or a method based on distance-angle signatures. The trial and error method is described in the context of defining a part model for a ball grid array. The systematic approach is described in the context of a leaded semiconductor, and the distance angle signature approach is described in the context of defining a part model for an odd form semiconductor component.

33 Claims, 24 Drawing Sheets

METHOD FOR AUTOMATICALLY DEFINING A PART MODEL FOR SEMICONDUCTOR COMPONENTS

CROSS-REFERENCE TO RELATED APPLICATION

This application claims priority from U.S. Ser. No. 60/344,064 for METHOD FOR AUTOMATICALLY DEFINING A PART MODEL, filed Dec. 28, 2001.

FIELD OF THE INVENTION

The present invention relates to methods and apparatus that locate semiconductor components. The present invention provides a method to automatically define a part model characteristic of an ideal semiconductor component that can be later used to locate similar semiconductor components.

BACKGROUND OF THE INVENTION

Modern manufacturing of semiconductor devices involves high volume production environments. One such environment involves populating circuit boards. Circuit boards are populated by automated machines generally referred to as "pick and place" machines. Generally, a pick and place machine acquires a semiconductor component from a tray of components, locates the component and places it on the circuit board. The function of locating the semiconductor component is carried out by a computer vision system. Typically the vision system locates a single specific semiconductor component at a time.

Prior to operation an operator often must program or train the vision system to recognize the particular semiconductor component to be located and placed on the circuit board. This involves creation of a part model. The part model represents characteristic or unique features of the semiconductor device. For example, if the device is a leaded device, the part model may include information about the number of leads, their size, their pitch and other related features.

While many different types of vision systems are available, each involves some appreciable amount of operator input. This is because even though there may be comparably few types of semiconductor components, e.g. leaded components, ball grid arrays and odd form devices, there are hundreds, if not thousands of different sizes and configurations of components for any given component type. Thus, a user cannot just simply inform the vision system the type of component, the user must exhaustively describe the component. While many different techniques exist to assist users in making this description users nonetheless often make mistakes. A need exists to further minimize the amount of user input when training vision systems to recognize different semiconductor components.

SUMMARY OF THE INVENTION

The present invention provides a method and an article of manufacture for automatically defining a part model.

A method for automatically defining a part model is provided that includes providing an image of a part model and selecting the type of part model to be defined. The selection of the part model may be automatic or manual. The method also includes a step for automatically defining the part model and recording the part model.

The image of the part model may be an image of a ball grid array with the type of part model being selected to be a ball grid array. In such situations the step for automatically defining the part model may further include selecting a plurality of arbitrary radii and looping over the radii to find a plurality of cues based on each radii. The plurality of cues is sorted for each of the radii into groups to create a plurality of ball groups. The best group is selected from the set of ball groups.

The image of the part model may be an image of a leaded component where the leaded component includes a number of leads having a defined pitch, with each lead having a defined location. Here the type of part model may be selected to be a leaded component. In such situations the step for automatically defining the part model may further include extracting at least one lead row rectangle from the image and determining the number of leads, their location and pitch from the lead row rectangles.

The image of the part model may be an image of an odd form component and the part model may be selected to be an odd form component. In such situations the step for automatically defining the part model may further include providing a plurality of templates. The templates may include a collection of points are defined by a distance and an angle value. A blob may be extracted from the image of the part model. A plurality of points may be extracted from the blob where the plurality of points defined by a distance and an angle value. The step for automatically defining the part model may also include comparing the plurality of points extracted from the blob against the plurality of templates and determining which template best corresponds to the plurality of points extracted from the blob.

A trial and error method for defining a part model may provided where an image of the component to be defined is provided. The image of the component includes geometric features having specific dimensions. A plurality of possible dimensions that may correspond to the specific dimensions in the image of the component is looped through and a score is determined for each of the plurality of possible dimensions. One of the possible dimensions is selected to define the part model as a function of the scores.

A systematic approach for defining a part model is also contemplated where an image of the component to be defined is provided. The image of the component includes unique geometric features arranged in the image in a pattern defined by a size and pitch. These unique geometric features are extracted from the image, and the size and pitch of the geometric features in the image are determined. The part model is defined based on the size and pitch of the geometric features in the image.

A method to define a part model using distance angle signatures is also provided. Here an image is provided where the image includes a distinct profile. A plurality of test profiles is also provided where each profile is defined by a distance and angle value. A blob is extracted from the image of the semiconductor component, and a plurality of points is extracted from the blob where the plurality of points is defined by a distance and an angle value. The plurality of points extracted from the blob is compared against the plurality of test profiles to determine which test profile best corresponds to the plurality of points extracted from the blob.

The present invention also contemplates an article of manufacture that includes a computer readable medium bearing computer program code embodied therein for performing a task of defining a part model. The computer program includes means for acquiring an image of a part model, means for receiving a selection corresponding to the type of part model to be defined, means for automatically defining the part model and means for recording the part model.

It is understood that the above referenced trial and error, systematic and angle distance signature methods may be encoded on a computer readable storage medium containing software executable by a computer to perform the associated process steps for automatically defining a part model for a semiconductor component wherein an image of the component is provided.

DETAILED DESCRIPTION OF THE PREFERRED EMBODIMENTS

The present invention substantially automates the training phase of semiconductor location. In the preferred embodiments the operator merely identifies the component type to be located. These component types may include for example, Leaded components, Leadless components, Ball Grid Arrays and Odd Form components. Knowing the component type, the present invention automatically creates or trains a part model corresponding to the details of the particular component type being trained. The resulting part model can be used to locate the same semiconductor component type for placement.

Figure 1:
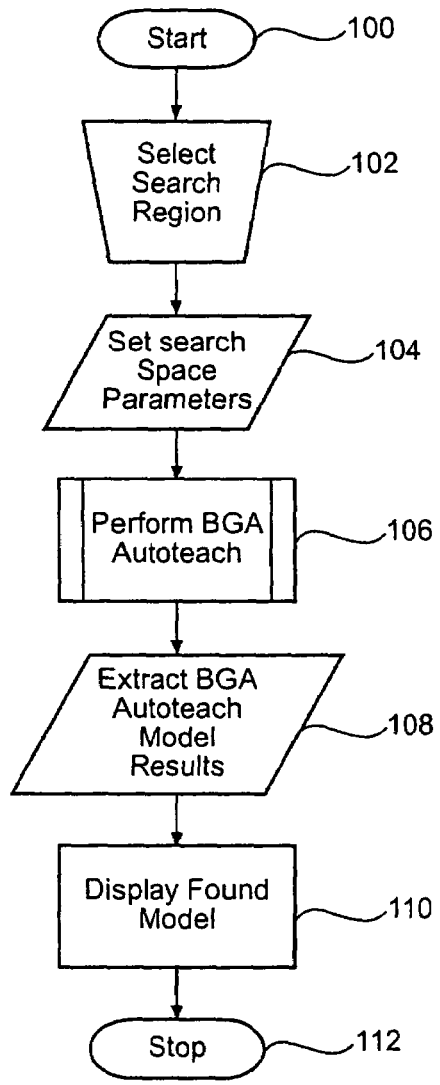
FIG. 1 is a high level flow chart illustrating the first embodiment of the present invention in the context of training a ball grid array.
Figure 1A:
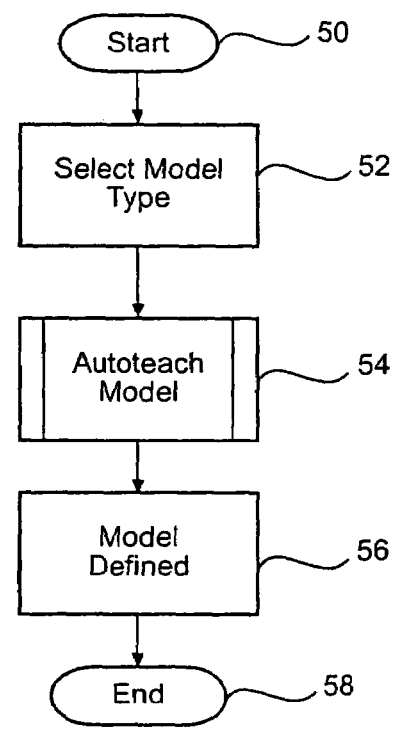
FIG. 1A is a high level flow chart illustrating the present invention.

With reference to FIG. 1A there is shown a high level schematic illustrating to present invention. The auto teach operation of the present invention starts at 50. The model type is selected at 52. It is understood that the model type may be selected either automatically or manually. The automatic teaching of the part model is performed by subroutine 54. The instant description provides three different types of part models that may be defined. These include part models for ball grid arrays, leaded components and add form shapes. It is understood that additional semi-conductor types may also be automatically defined. The part model is defined at 56 and the process ends at 58. Once the part model is defined, it may be used to locate semi-conductor components for placement.

The present invention provides three alternate techniques to create a part model of a known component type. The first involves assuming that the component includes a known geometric shape, e.g., a circle or rectangle, and determining which size of that geometric shape best corresponds to the model being trained. The first method can be described as a trial and error method in which different sizes of the shape are tried to find the best fit. The second involves establishing restricted windows in which important features are present and reducing the size of those windows until the important features are easy to find. The final method involves the use of angle distance diagrams to create unique signatures to characterize the model.

The instant specification will set forth examples of different semiconductor component types and the manner in which they are automatically trained. It is understood that the present invention is not limited to the specific examples set forth and the use of each specific technique set forth is not limited to the specific component type with which it is described.

I. AUTO TEACHING OF A PART MODEL ACCORDING TO THE FIRST PREFERRED EMBODIMENT FOR A BALL GRID ARRAY

With reference to FIGS. 1–16 there is shown a series of flow charts that illustrate a first preferred embodiment utilizing a trial and error method in the context of training a ball grid array. A BGA is characterized by a series of balls or bumps on one of its faces. These balls are arranged in an array that may be continuous or discontinuous. In general, the process of training a ball grid array will result in a part model defining information that may include the number of balls, their diameter and their pitch. The part model may also identify gaps in the array.

FIG. 1 illustrates a high level flow chart of the first preferred embodiment associated with automatically teaching a ball grid array (BGA) semiconductor component, i.e., creating a part-model for a BGA. As shown at 100, an operator initiates the BGA training function by identifying for the system that a BGA component is to be trained. The operator then performs the simple tasks of selecting a search region, shown at 102, and setting the search space parameters at 104. The search region merely defines a field of search for the vision system. In essence the vision system looks at image data within the search space and ignores the image data external to the search space. As defined, the search space parameters set forth a maximum and a minimum possible radius for the balls of the BGA model. In the preferred embodiment, defaults for these values are provided.

At 106, the system executes the BGA functionality subroutine in order to create the BGA part model. In this example, the BGA is trained by looping through a group of possible ball radii and selecting the particular radius having the highest score. The results from the auto teach, which preferably include best ball diameter, pitch and size of the array, are reported at 108 and displayed at 110. Once the BGA part model is defined, a pick and place machine may locate similar BGA components and place them at their appropriate location on the circuit board.

Figure 2A:
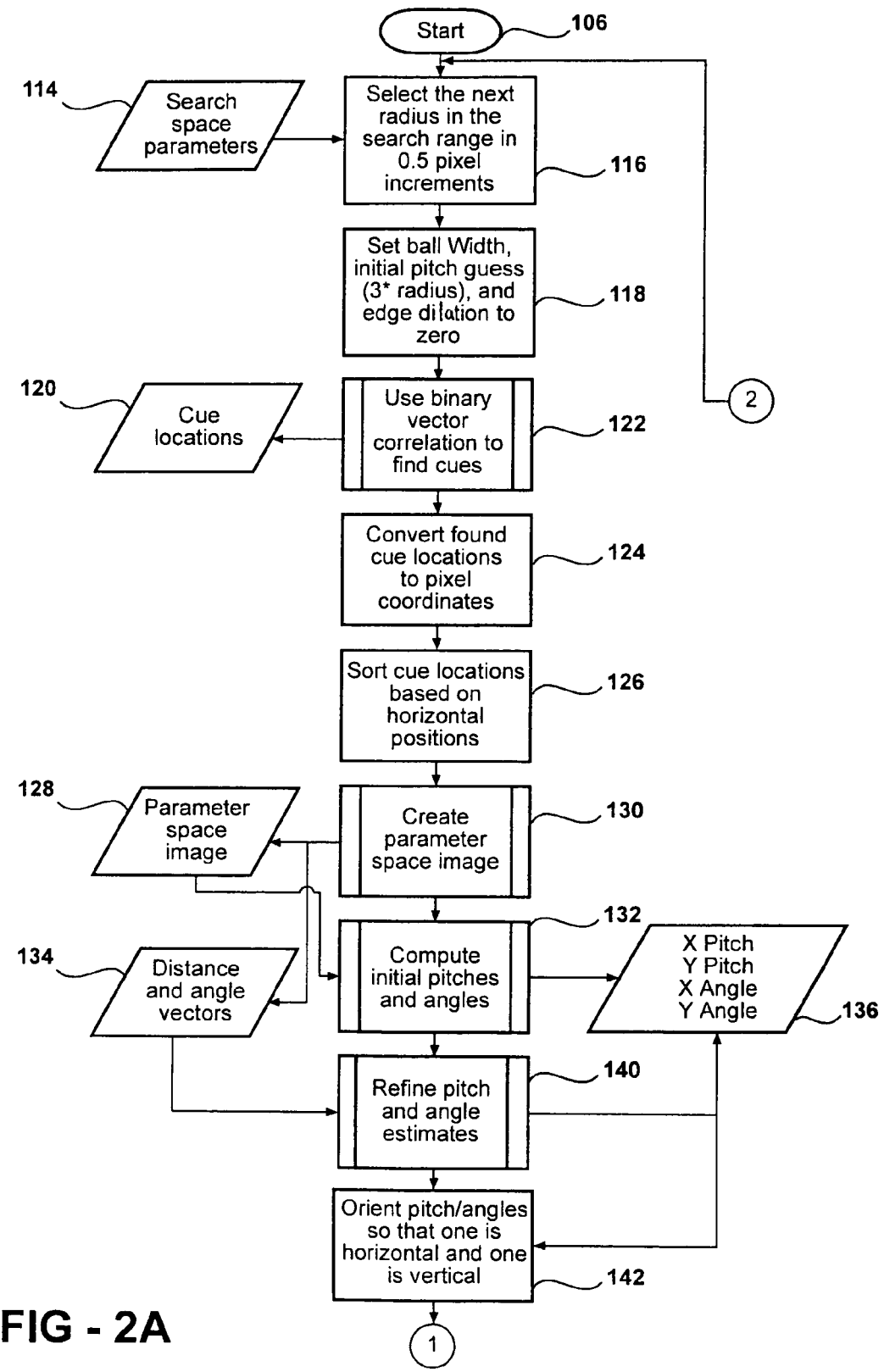
FIGS. 2A and 2B provide algorithm details for the first preferred embodiment of the present invention in the context of training a ball grid array.
Figure 2B:
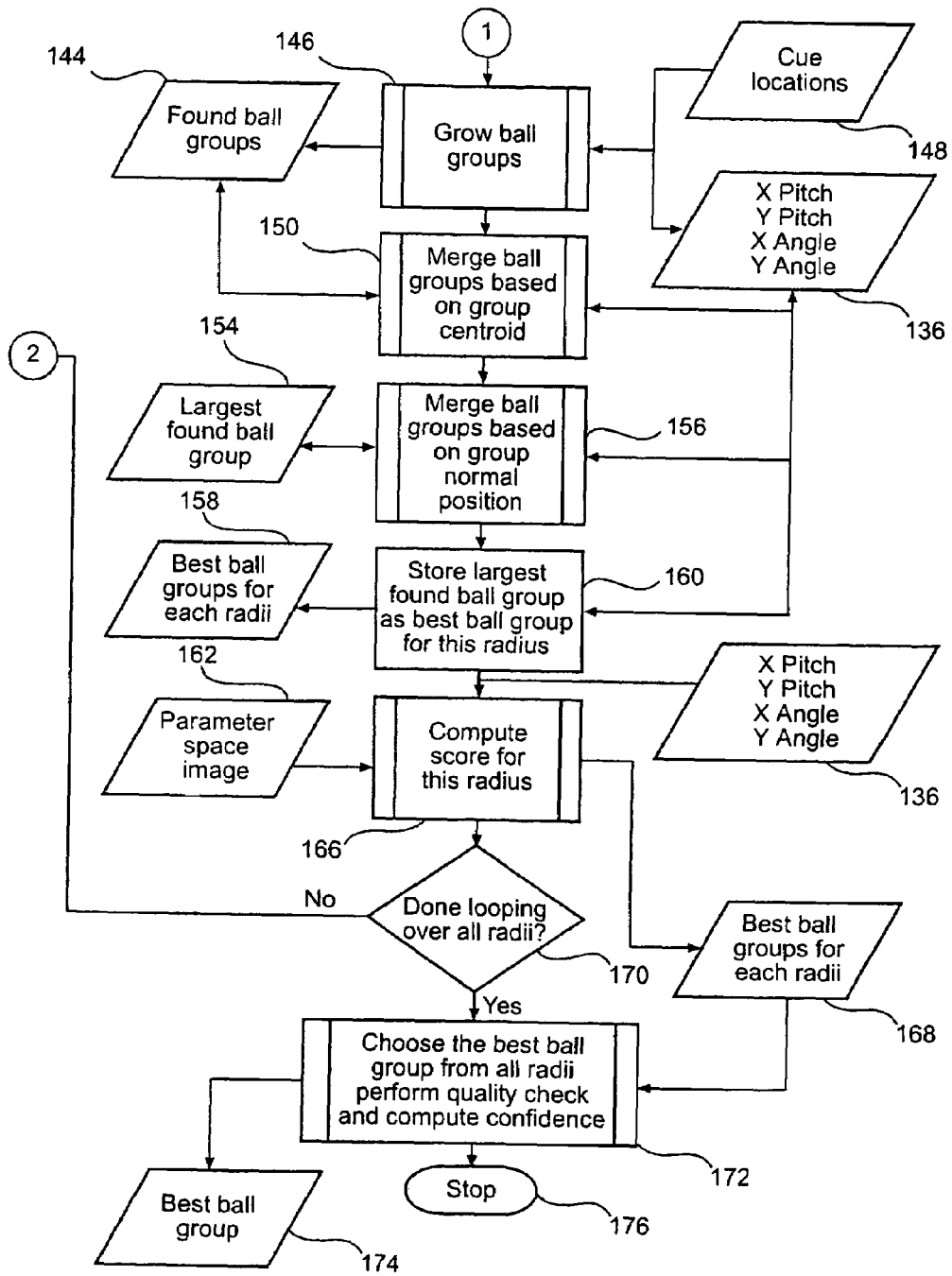

With reference to FIGS. 2A and B, the technique of the first preferred embodiment in the context of automatically teaching a BGA semiconductor component at 106 is shown in greater detail. In particular, the system selects the smallest radius of a possible ball at 114 and 116 and determines whether that radius corresponds to the balls in the image of the component to be trained. The system presumes a pitch and sets an edge dilation parameter to zero at 118. Edge dilation is a known technique used to thicken edges. The system calls a binary vector correlation subroutine at 122 to locate potential candidates for balls. Binary vector correlation is a technique that determines correspondence between a high level feature, in this case a circle, and a collection of low level features, in this example edges from the image of the BGA component being trained. Application of binary vector correlation yields a collection of cue locations that correspond to the best possible matches to the radius chosen. The cue locations are recorded at 120.

Other correlation techniques, such as normalized correlation or gray scale vector correlation may be used in place of binary vector correlation. Gray scale vector correlation is described in commonly assigned U.S. Pat. No. 6,623,530, entitled "Vector Correlation System for Automatically Locating Patterns in an Image," which is incorporated herein by reference.

The cue locations are converted into pixel coordinates at 124. This involves addressing the cue locations in non-dimensional terms, corresponding the pixel position. For example, if the vision system used a CMOS sensor having a pixel array of 1000×1000 pixels, the cues would be addressed in terms of that array. The cues are then sorted based on their horizontal position at 126. The horizontal sort is done based on the assumption that the array of balls is rectangular, and thus each ball will have a nearest neighbor at 0, 90, 180 and 270 degrees respectively, with the nearest neighbor in the horizontal direction, 0 and 180 degrees, being the X pitch and the nearest neighbor in the vertical direction being in the Y pitch.

Figure 3:
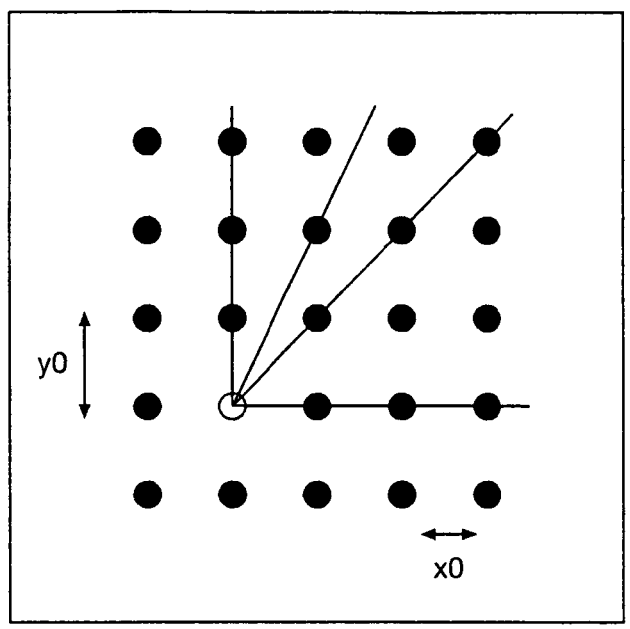
FIG. 3 illustrates a sample ball grid array.
Figure 4:
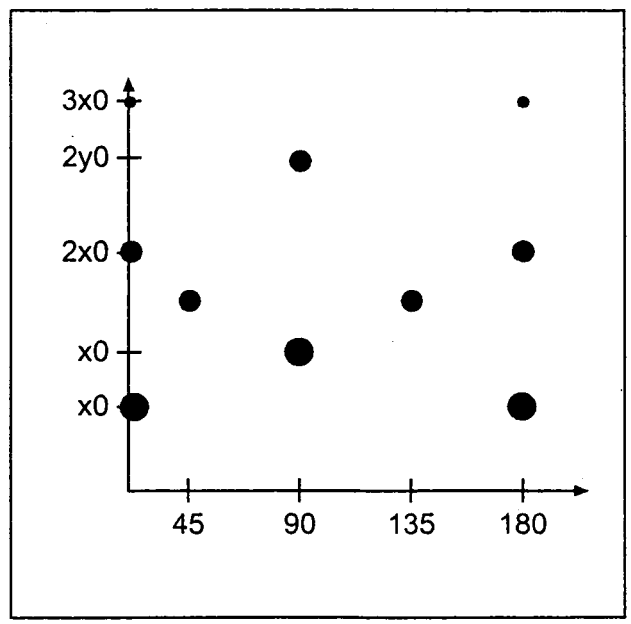
FIG. 4 illustrates an image of a ball grid array transformed into angle-pitch space.

FIG. 3 represents a sample ball grid array with an X pitch equal to X0 and a Y pitch equal to Y0. The lines drawn from the hollow ball show the periodicity of the array along angles of 0, 45, 67.5 and 90 degrees. With reference to FIG. 4, this relationship can be transformed into angle-pitch space with the size of the circles representative of the intensity of each spot. FIGS. 3 and 4 are useful to determine the validity of the array.

Figure 5:
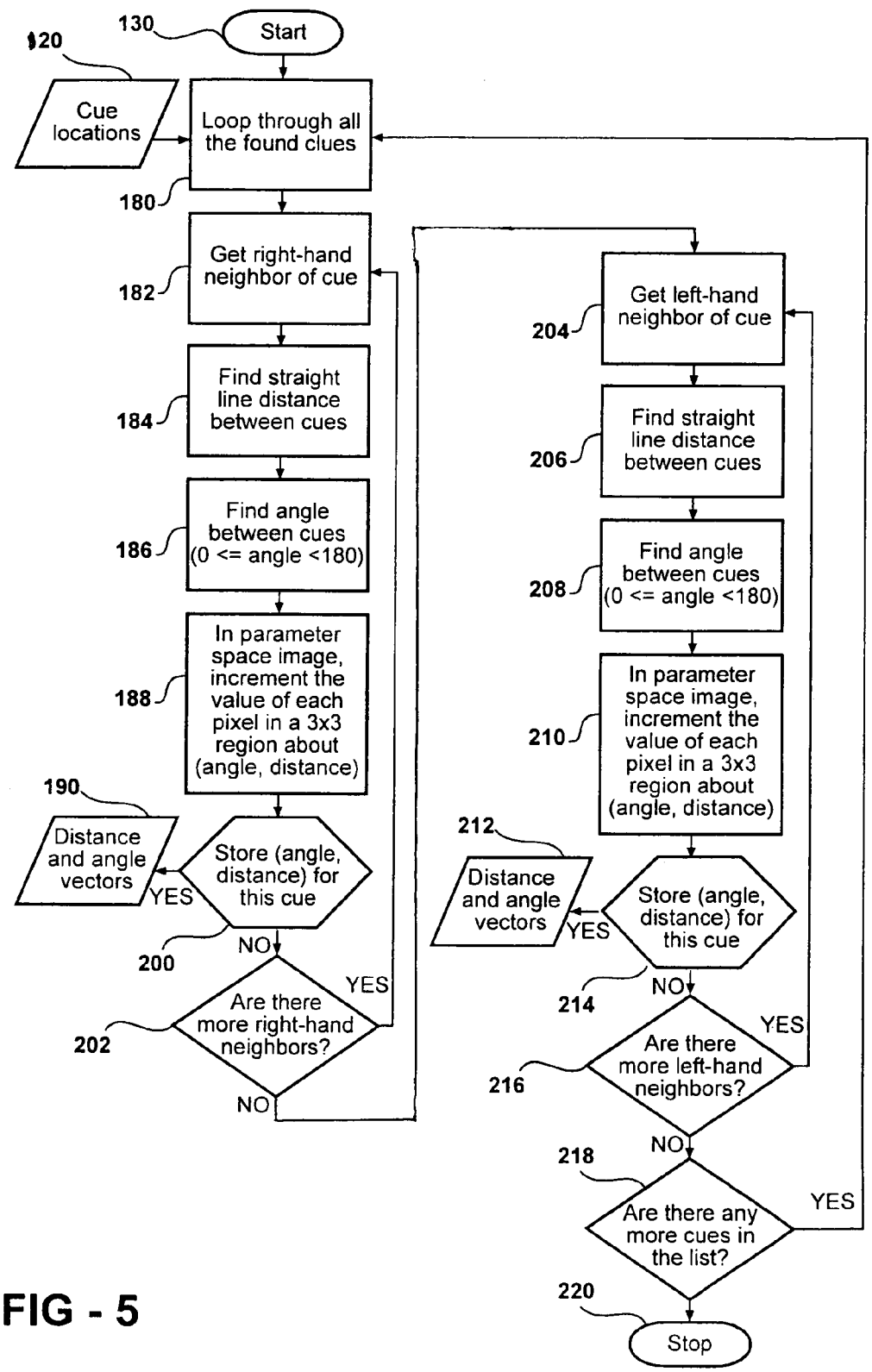
FIG. 5 is a flow chart illustrating the creation of a parameter space image in the context of training a ball grid array.

A parameter space image is created by subroutine 130, which is illustrated in greater detail in FIG. 5. A graphical example of a parameter space image is illustrated in FIG. 4. The parameter space is defined by the angle between cues and the distance between cues. Each parameter space image preferably has 180 columns, one for each angle, and a number of rows defined by the maximum allowable pitch, in pixel space, plus 2. The parameter space image is used to determine the X and Y pitch as well as the angle between each array direction and the X and Y axes. The system uses all of the cue locations, previously noted at 120. As indicated by reference numeral 180, in FIG. 5 subroutine 130 will operate on all of the cue locations at 120.

For an individual cue location, subroutine 130 operates in the following manner. Subroutine 130 acquires the right hand neighbor of each cue at 182 and finds a straight-line distance between those cues at 184. The angle between the cues is found at 186, with subroutine 130 assuming that angle to be equal to or greater than 0 degrees and less than 180 degrees. As shown at 188, the value of each pixel is incremented in the 3×3 region about each pixel. This operation involves thickening the edges in all directions. The associated angles and distances for the cue being evaluated is stored at 200 and converted into distance and angle vectors at 190. At 202, if there are additional cues positioned to the right of the cue being evaluated, i.e., the right hand neighbors, the system returns to 182 and creates another parameter space image.

If subroutine 130 has moved through all of the right hand neighbors for any given cue location at 120, the system then shifts to the left hand cues at 204. In the same manner as subroutine 130 did for the right hand neighbors, the subroutine finds the straight line distance between the cue of interest and its left hand neighbors at 206. Subroutine 130 also determines the angles between the cues at 208. At 210, the value of each pixel is incremented in a 3×3 region about the cue of interest. The angle and distance for this cue are stored at 214 and are converted into distance and angle vectors at 212. If there are more left hand neighbors at 216 the system loops back to 204 and continues to construct the parameter space image for the left hand neighbors.

If there are no more left hand neighbors, the system checks if there are more cues in the list at 218. In this manner the system can proceed through multiple rows of a two dimensional array. If there are more cues, the system loops back to 180 and creates a parameter space image for that cue using its right and left hand neighbors as previously described. The subroutine 130 ends at 220.

With reference again to FIGS. 2A and B, the parameter space image is recorded at 128. Using the parameter space image the system utilizes subroutine 132 to compute initial pitches and angles. The initial pitches and angles subroutine 132 references an objective function used to determine the angle and pitch in both the X and Y directions. Initially, the objective function rewards locations in parameter space that have high pixel values, angles near 0, 90 and 180 degrees, and small distances (to distinguish peaks occurring at unit values of the pitch from larger integral values of the pitch). In essence, this rewards locations that fall into a consistent array.

Figure 6:
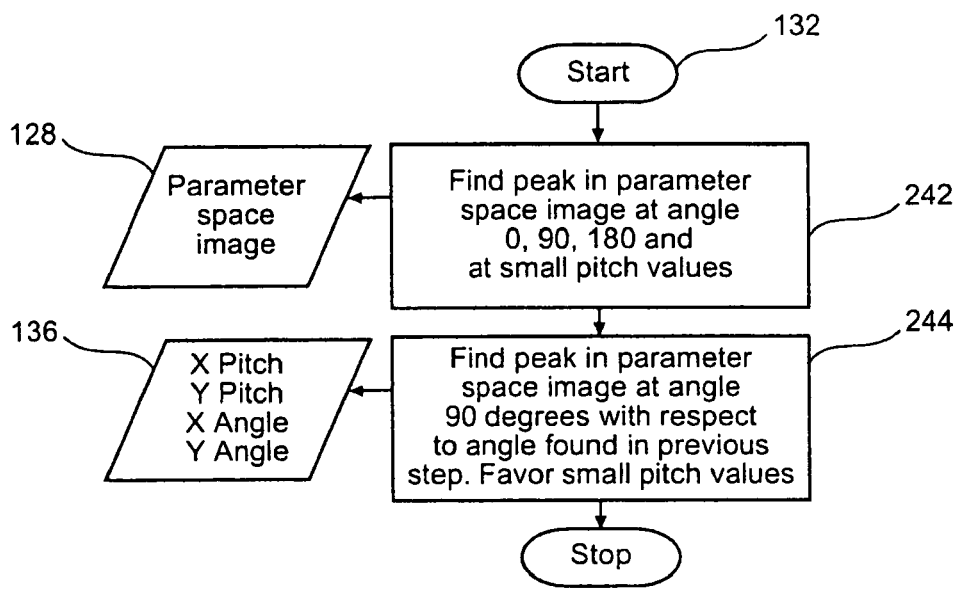
FIG. 6 is a flow chart illustrating a rough pitch and angle estimate in the context of training a ball grid array.
Figure 6A:
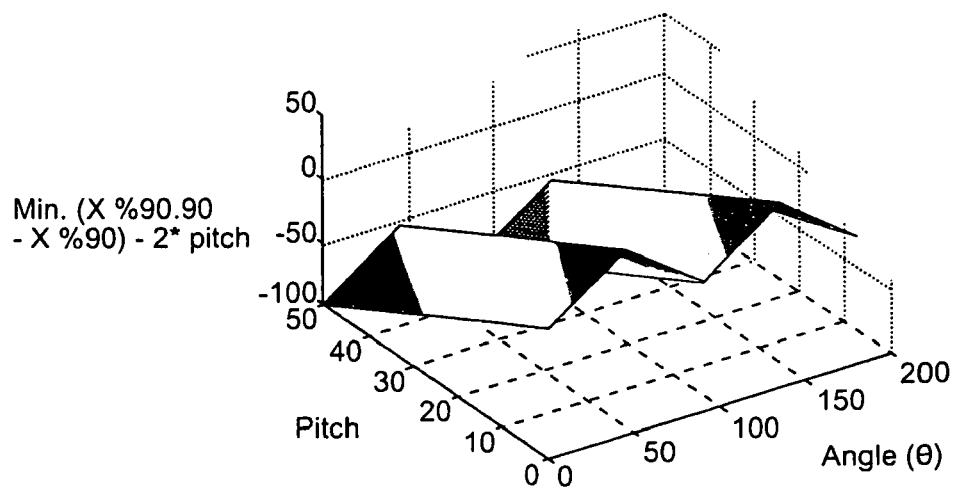
FIG. 6A shows an angular and a distance portion of the objective function in the context of training a ball grid array.
Figure 7:
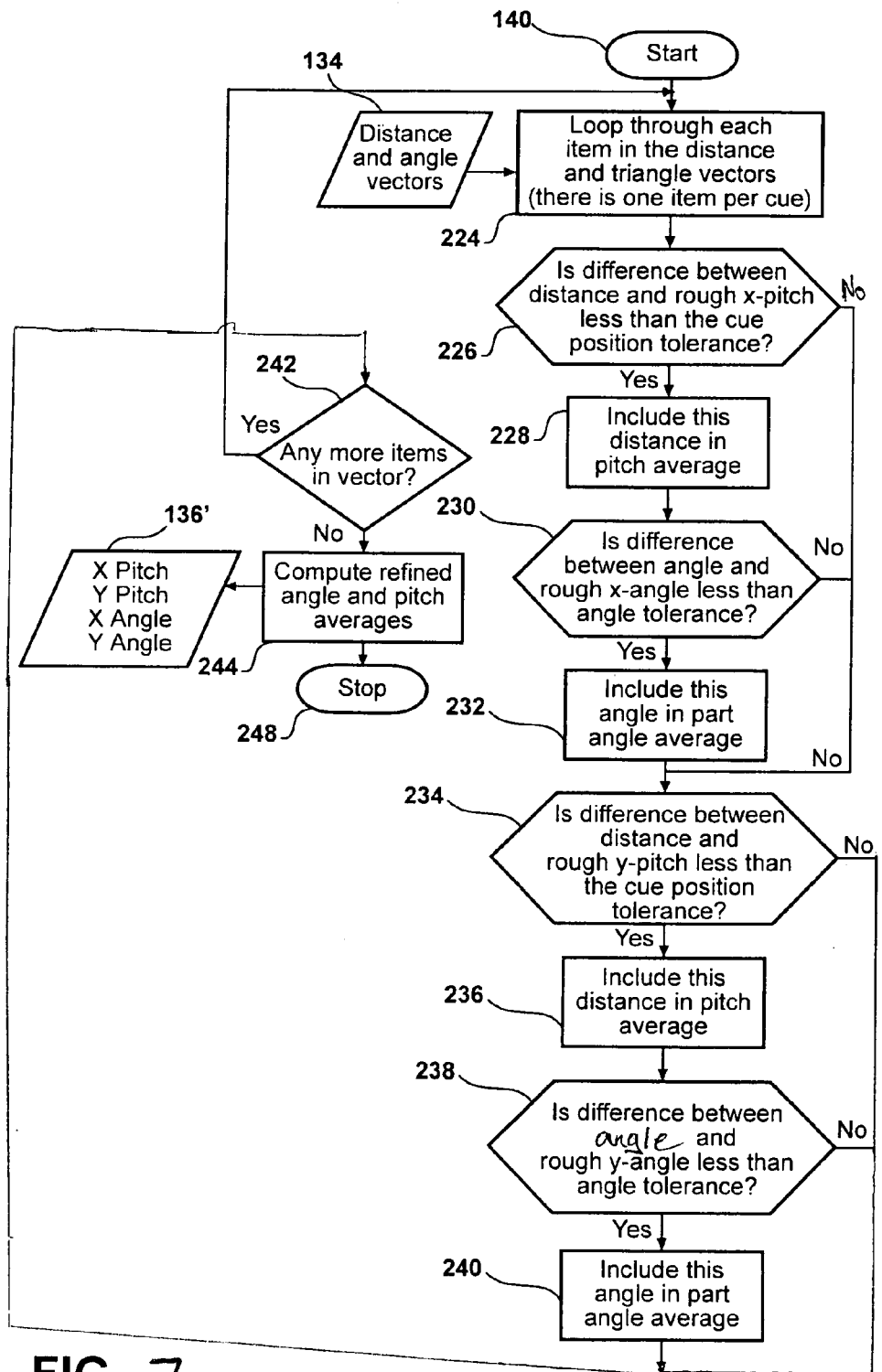
FIG. 7 is a flow chart illustrating a refined pitch angle estimate in the context of training a ball grid array.

With reference to FIG. 6 there is shown a flow diagram describing the initial calculation of pitches and angles subroutine 132. Using the parameter space image from 128, the system finds peaks in the parameter space image at angles of 0, 90 and 180 degrees and at small pitch values at 242. At 244 the system finds peaks in the parameter space image at an angle of 90 degrees with respect to the angle found in step 242, favoring small pitch values. The system reports the X pitch, Y pitch, X angle and Y angle at 248. The equation for the above described objective function is graphically illustrated in FIG. 6A and can be written as:

$$f(\theta, pitch) = \text{Pixel Value}(\theta, pitch) - \min(\theta\% 90, 90 - (\theta\% 90)) - 2 * pitch$$

With reference again to FIGS. 2A and B, the automatic teaching technique of the present invention preferably refines the pitch and angle estimates with subroutine 140. The manner in which the pitch and angle estimates are refined in subroutine 140 is illustrated in greater detail in FIG. 7. The system refines the pitch and angle estimates for each distance and angle vector. As described there is only one distance and angle vector for each cue. As referenced at 224, subroutine 140 refines the pitch and angle estimates for each distance and angle vector recorded in 134. At 226, subroutine 140 queries whether the difference between the distance and rough X pitch is less than the cue position tolerance. If this difference is less than the cue position tolerance, the system includes the distance in the pitch average at 228. Subroutine 140 then queries whether the difference between the angle and rough X angle is less than the angle tolerance at 230. If the difference between the angle and rough X angle is less than the angle tolerance then the angle is included in part of the angle average. As shown, the system loops through the distances and angles, and refines them using the pitch average and angle average until the differences between distance and rough X pitch and angle and rough X angle are less than their respective tolerances.

As shown at 234, subroutine 140 then makes the same refinement to the distance and angle in the Y direction. In particular at 234 subroutine 140 compares the difference between the distance and rough Y pitch to the cue position tolerance. If the difference is less than the cue position tolerance, the distance is included in the pitch average at 236. Similarly subroutine 140 checks whether the difference between the angle and rough Y angle is less than the angle tolerance at 238 and includes the angle in part of the angle average at 240. If all of the items from a vector have been exhausted at 242 subroutine 140 computes and stores the refined angle and pitch averages at 244 and 136. In this manner the system refines the pitch and angles in both the X and Y directions for each cue.

With reference again to FIGS. 2A and B, after the pitch and angle estimates have been refined at 140 and recorded at 136, the system orients the pitch/angles so that one is horizontal and one is vertical at 142. Once the pitch/angles have been oriented to the vertical, the system grows the ball groups at subroutine 146. Growing the balls groups essentially adds assumed cue locations for the best pitch and angles for any particular radius. First, a series of ball groups are formed that group neighboring cue locations that form a grid compatible with the found pitches and angles. Next, starting with the largest ball group, other groups that lie on the same grid (but may not be nearest neighbors) are merged together. This artificially created ball group can be compared against the actual locations to determine conformance.

Figure 8:
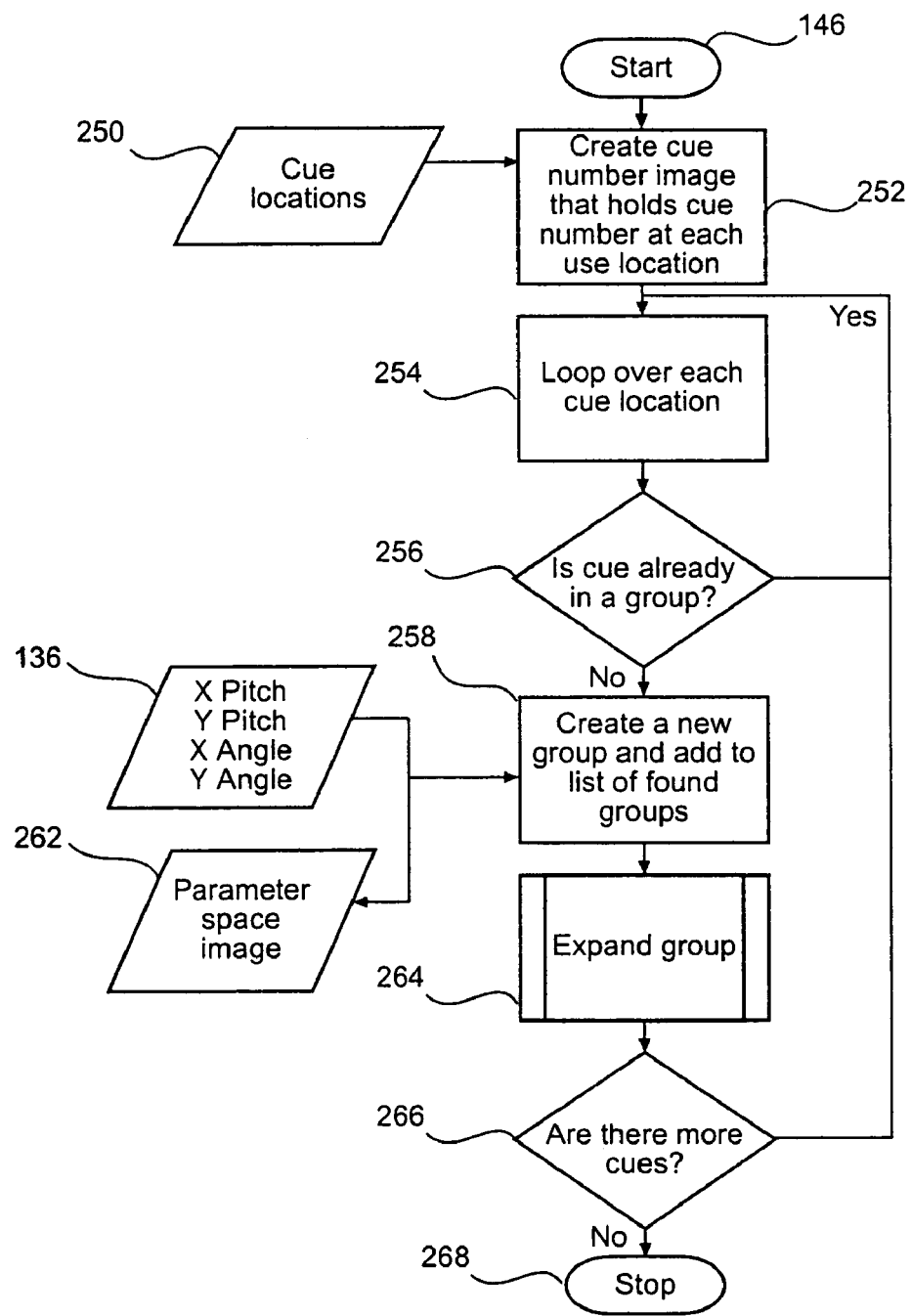
FIG. 8 is a flow chart illustrating the grow ball groups function of the first embodiment in the context of training a ball grid array.
Figure 9:
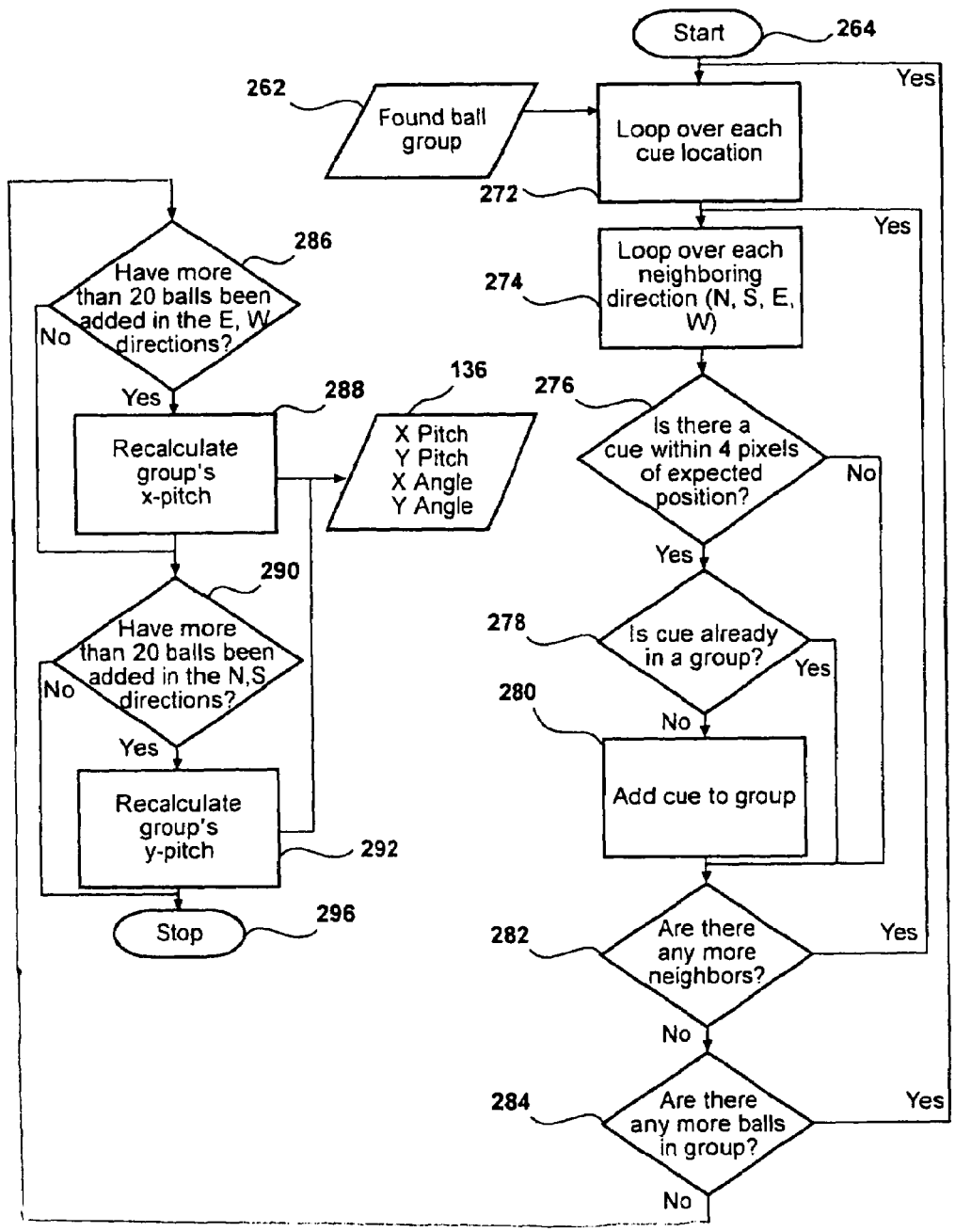
FIG. 9 is a flow chart illustrating an expand group array function of the first embodiment in the context of training a ball grid array.

The operation of grow ball groups subroutine 146 is illustrated in more detail beginning with FIGS. 8 and 9. As shown at 250 and 252, the system takes the cue locations and creates a cue number image, where each cue is numbered, e.g., 1, 2, 3, 4, etc., so that each cue location has a number. The system then loops over each cue location (or cue number) beginning at reference number 254. If the cue is already in a group at 256 the system loops back to 254 where a new cue is chosen. Once a cue is found which is not assigned to a group, a new group is created at 258. The X pitch, Y pitch, X angle and Y angle of the cues, as discussed previously and as recorded at 136, are evaluated against the X pitch, Y pitch, X angle and Y angle of the new group at 258. If the pitches and angles are comparable, the new group is recorded as a found group at 262.

Each new ball group is then expanded at subroutine 264. The expansion of each ball group is more comprehensively illustrated in FIG. 9. For each found ball group at 262, subroutine 264 loops over each ball in the group at 272. Subroutine 264 loops over each cue in a neighboring direction, i.e., 0, 90, 180 and 270 degrees, at 274. During this operation, subroutine 264 queries as to whether there is a corresponding cue within four pixels of the expected position as shown at 276. If the system finds a cue then the system queries as to whether the cue is already assigned to a group at 278. If the cue is not part of a group then it is added to the group at 280. If the cue is part of the group, or if the cue has been added to the group, the system queries as to whether there are any additional neighboring cues at 282. If there are neighboring cues the system loops back to 274 and tries to add those neighboring cues to the group.

If there are no more cues, subroutine 264 queries as to whether there are any more balls in the group at 284. If there are more balls in the group subroutine 264 loops back to 272 and again attempts to expand the group. If there are no more balls in the group, subroutine 264 queries at 286 as to whether more than 20 balls have been added in the east and west directions, i.e., at 90 and 270 degrees. If more than 20 balls have been added, then the system recalculates the X pitch at 288, which is stored at 136. Subroutine 264 also inquires as to whether more than 20 balls have been added in the north and south (Y) direction at 290 and, if so, the Y pitch is recalculated at 292. This updates the X pitch, Y pitch, X angle and Y angle for the ball diameter being evaluated. The expand group subroutine 264 ends at 296.

Returning to FIG. 8, after the groups have been expanded, subroutine 146 looks for more cues at 266. If there are more cues the subroutine 146 loops back to 254 and expands over the remaining cues, one at a time. If there are no more cues at 266 the grow ball groups subroutine is stopped at 268.

Returning to FIGS. 2A and B, the ball groups grown by subroutine 146 are stored at 144 as found ball groups. The ball groups are merged based on a centroid method at subroutine step 150.

Figure 10:
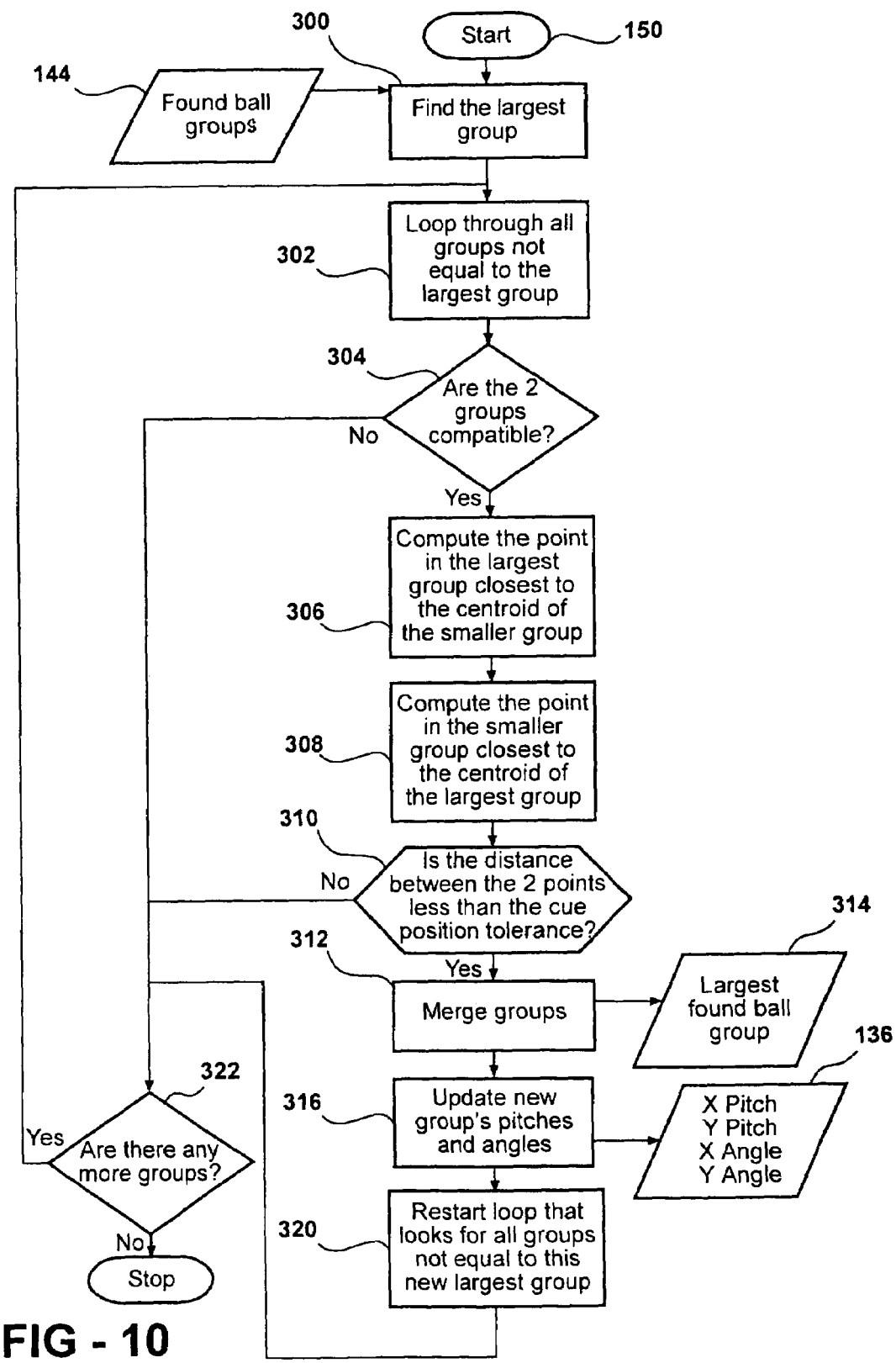
FIG. 10 is a flow chart illustrating a merge ball groups-centroid method function of the first embodiment in the context of training a ball grid array.
Figure 11:
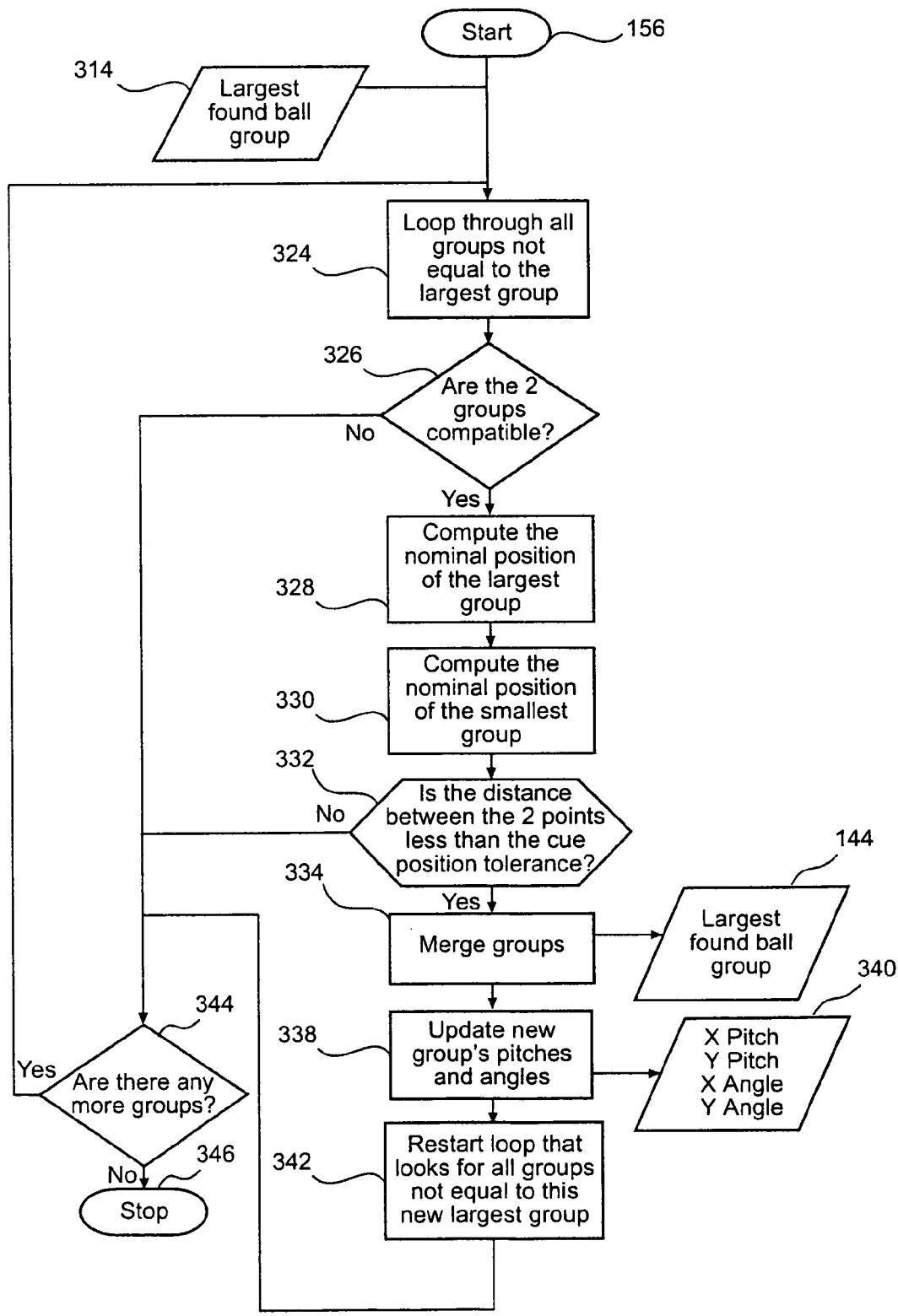
FIG. 11 is a flow chart illustrating a merge ball groups-nominal position method function of the first embodiment in the context of training a ball grid array.

The details of the merge ball groups function of subroutine 150 is set forth in more detail in FIG. 10. At 300, the largest group from the found ball groups stored at 144 is selected. At 302, subroutine 150 enters a loop that evaluates all of the remaining groups to determine whether they can be merged. At 304, subroutine 150 queries as to whether a respective group is compatible with the largest group. In the first preferred embodiment, a potentially compatible ball group is defined if the group has a single ball in it, or one of the following four conditions is met: 1) the difference between the X pitches of the two groups is less then 5% of the X pitch of the largest group; 2) the difference between the Y pitches of the two groups is less than 5% of the Y pitch of the largest group; 3) the difference between the X angles between the two groups is less than 2 degrees; or 4) the difference between the Y angles between the two groups is less than 2 degrees.

If two compatible ball groups exist at 304, subroutine 150 computes a point in the largest group closest to the centroid of the smaller group at 306. Subroutine 150 also computes the point in the smaller group closest to the centroid in the largest group at 308. If the distance between the points calculated at 306 and 308 is less than the cue position tolerance the two groups are merged at 312. The merged groups are defined to be the new largest ball group at 314. Further, at 316 the subroutine 150 updates the new group's pitches and angles and looks for all groups not equal to the new largest group as referenced by numeral 320. If there are more groups, as queried at 322, subroutine 150 returns to 302 and looks for compatibility at 304. If the distance between the points is not less than the cue position tolerance, at 310, subroutine 150 queries as to whether there are more groups at 322 and, if so, looks for compatibility at 304.

With reference again to FIGS. 2A and B, once the ball groups have been merged using the centroid method at 150, they are merged again based on group nominal position as shown by subroutine 156. Subroutine 156 is set forth in greater detail in FIG. 11. Referencing FIG. 11, subroutine 156 operates in a manner very similar to that of subroutine 150 with the exception that subroutine 156 attempts to merge two groups based on their nominal position rather than on their centroids. Subroutine 156 begins by inputting the largest found ball group from subroutine 150 at 314. As referenced by 324, subroutine 156 is applied to all of the groups not equal to the largest found ball group. Compatibility at 326 is measured in the same fashion as for subroutine 150. At 328 and 330 the nominal position is computed for both the largest ball group and the smaller ball group respectively. If the distance between the nominal positions of the largest ball group and the smaller ball groups is less than the cue position tolerance at 332, then the smaller ball group is merged into the largest ball group at 334. The largest ball group is then updated at 336. As with subroutine 150, the new group's pitches and angles are updated at 338 and the new pitches and angles are stored at 136. Subroutine 156 then restarts the loop looking for ball groups that are not equal to the largest ball group at 342. If more ball groups exist, then subroutine 156 looks for compatibility as explained above and seeks to expand the largest ball group. Similar to subroutine 150, if the smaller ball group is not compatible with the largest ball group at step 332, subroutine 156 goes back to look for additional ball groups that have not been added to the largest ball group at 344. In this manner both subroutines 150 and 156 seek to merge ball groups to create a single ball group. Subroutine 156 ends at 346.

With reference again to FIGS. 2A and B, the largest found ball group is then stored at 160 and 158 and is defined at 158 to be the best ball group for the specific radius assumed at 116. A score is then computed for the radius under consideration at subroutine 166. In general the score is calculated by looking at the parameter space image near the best X and Y angles and X and Y pitches as determined previously and recorded at 136. The score evaluates the correlation results from 122 and rewards high intensity and sharp peaks and penalizes background noise in the region surrounding the peaks. The value of the score is composed of the sum of three components. The first component represents the pixel values at the best X and Y angles and pitches. The second component represents peaks in a small area surrounding the best points. This component is the sum of all the pixel values in a 5 by 5 region about each of the best points. The last component represents any background noise in an area around the best points.

Figure 12:
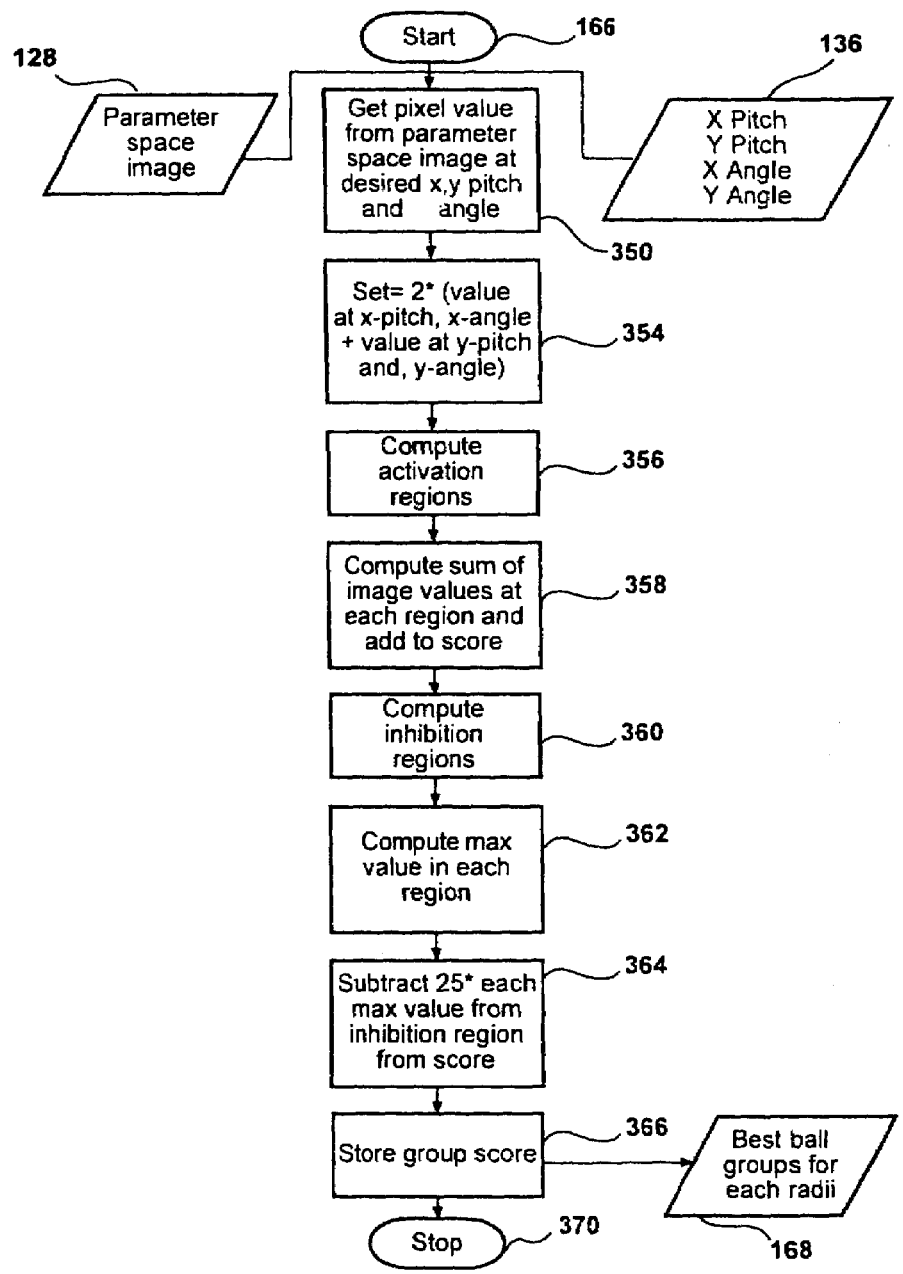
FIG. 12 is a flow chart illustrating the computation of score for the first embodiment in the context of training a ball grid array.

The score subroutine 166 is illustrated in FIG. 12. As shown, the score utilizes the parameter space image 128 and the pitches and angles stored at 136. The first step of subroutine 166 is to get pixel values from the parameter space image at the desired X, Y pitches and X, Y angles as shown at 350. The score is set to twice the value at the X pitch, X angle plus the values at the Y Pitch and Y angle at 354. At 356 the compute score subroutine 166 computes activation regions and inhibition regions. The actuation region is for areas where balls should be found and the inhibition region is for where balls should not be found. In the preferred embodiment, there are two activation regions. The first activation region is a 5 by 5 region about the X pitch and X angle, and the second activation region is a 5 by 5 region about the Y pitch and Y angle. At 358 the sum of image values at each activation region is computed and added to the score.

At 360 the inhibition regions are computed. There are two inhibition regions. The first region is a region the size of 25% of the X pitch and 20 degrees about the X angle. The second region is a region the size of 25% of the Y pitch and 20 degrees about the Y angle. It is understood that these are merely preferred values for both the activation region and the inhibition regions; the values may be changed. The maximum value for each inhibition region is computed at 362. At 364, twenty-five (25) is subtracted from each maximum value from the inhibition region, from the score. The value twenty-five is merely the number of points in the activation region. It is understood that this adjustment could be made by subtracting other numbers. The group score is stored at 366 relative to the best ball group for each radius, which is at 168. Subroutine 166 ends at 370.

With reference again to FIGS. 2A and B, once the score is calculated at 166, the system determines if there are additional radii to be tried at 170. If additional radii are available, the system returns to 116 and begins the above described process again for the next radius. Ultimately, the system will have a series of largest best ball groups, one largest best group associated with each different radius. Each of the largest ball groups will have an associated score. The ball group with the highest score is the best ball group as determined at subroutine 172. This best ball group is then defined as the part model for the image being evaluated at 174. The process ends at 176.

Figure 13:
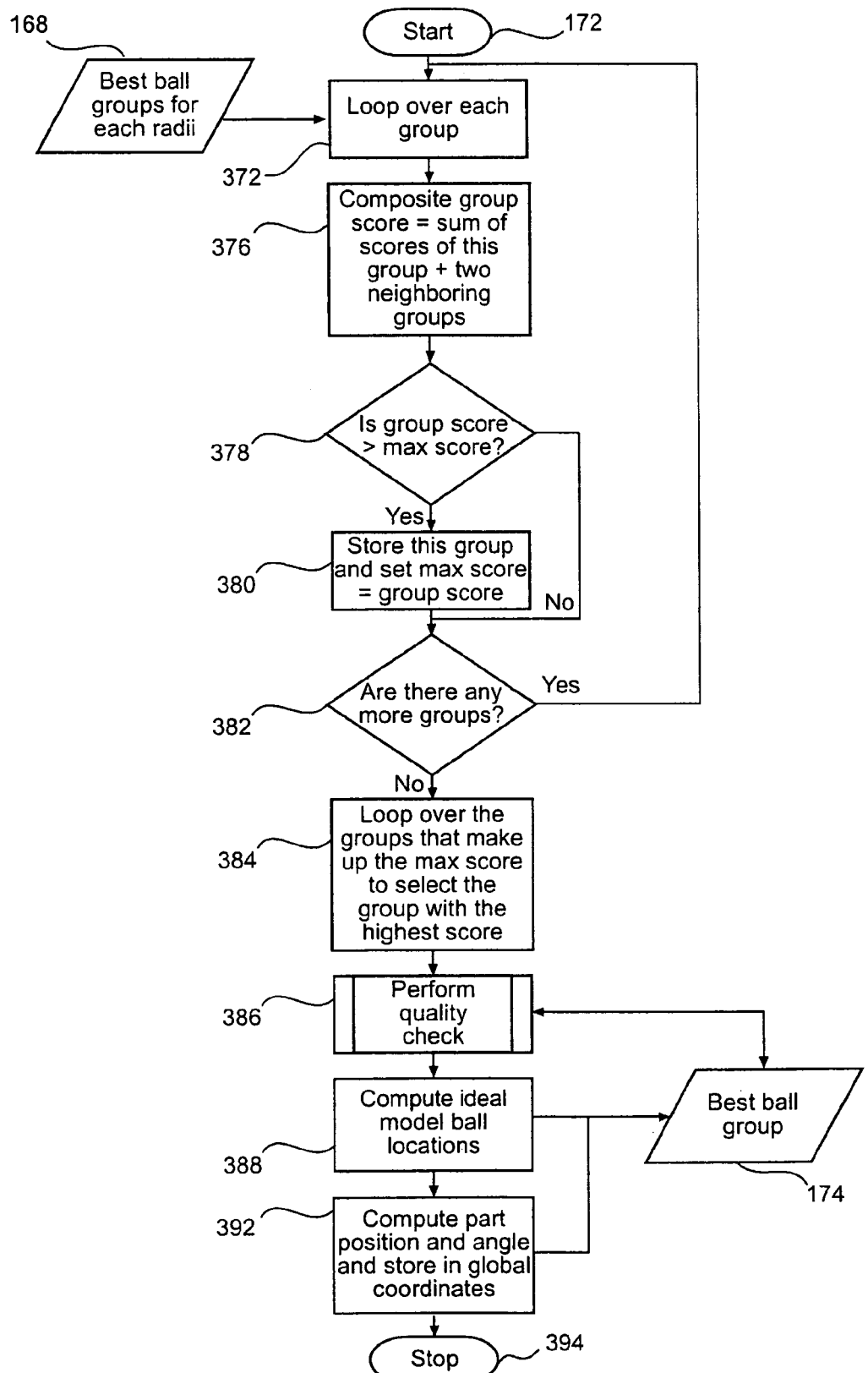
FIG. 13 is a flow chart illustrating the choosing of the best group of balls function of the first embodiment in the context of training a ball grid array.

With reference to FIG. 13 there is shown the manner in which subroutine 172 chooses the best ball group, which will ultimately correspond to the part model. Subroutine 172 accesses the best ball groups for each of the radii from 168. Reference numeral 372 indicates that subroutine 172 will be applied to all of the largest or best ball groups for each radius. A composite group score is calculated at 376. The composite group score equals the sum of score of this group plus the scores from two neighboring groups. The neighboring groups are chosen based upon their proximity in radius. The purpose of the composite score is to more accurately select the best part model by eliminating false positives. False positives are radii that have a good score but do not correspond to the original image. These false positives are typically bordered by poor scores. A true positive is generally bordered by good scores. By including adjacent scores in the composite, false positives are excluded.

At 378, 380 and 382, subroutine 172 sets a max group score to be equal to the composite group score and subsequently compares later groups' scores against it. This process results in the selection of the highest composite score. At 384, subroutine 172 loops over the group composite scores and selects the highest score and the group associated with it to be the part model. Subroutine 172 then performs a quality check subroutine 386 on the chosen group.

Figure 14:
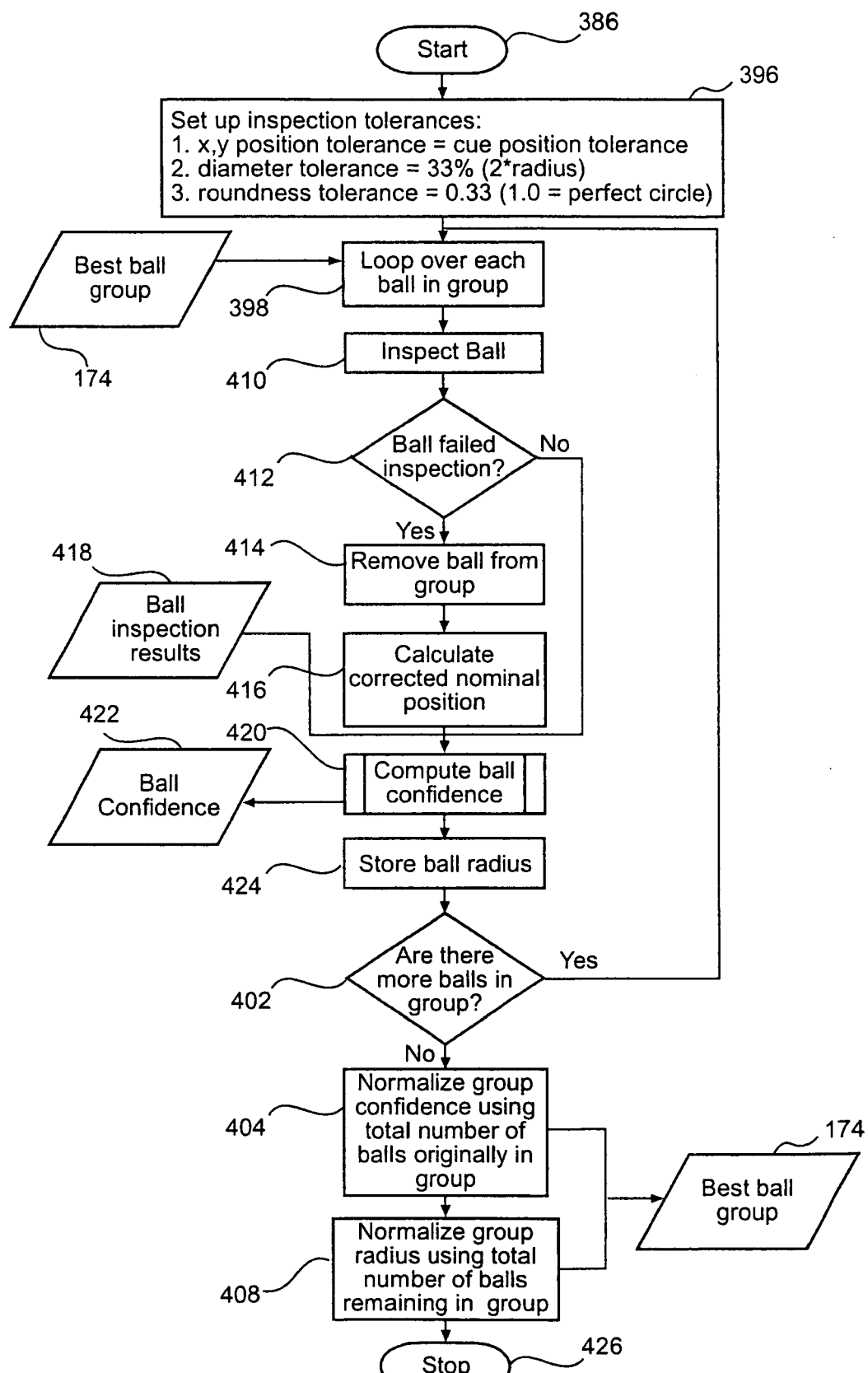
FIG. 14 is a flow chart illustrating a quality check function of the first embodiment in the context of training a ball grid array.

In quality check subroutine 386, any balls that fall outside nominal tolerances will result in that ball being removed from the final model. With reference to FIG. 14 there are shown the details of the quality check. Initially subroutine 386 sets up inspection tolerances at 396. Subroutine 386 sets up inspection tolerances as follows: an x,y position tolerance is set to be the same as the cue position tolerance; a diameter tolerance is preferably set to be 33% of the diameter associated with the radius; and a roundness tolerance is arbitrarily set to 0.33. Subroutine 386 considers each ball in the ball group as reflected at 398 to determine if it meets the defined quality standards. As shown at 410 each ball is inspected. At 412 and 414 if a ball fails inspection it is removed from the ball group. Subroutine 386 then calculates a corrected nominal position for the ball group and the ball inspection results are recorded at 418.

As discussed in more detail below, subroutine 386 also calculates a ball confidence at subroutine 420, which ball confidence is recorded at 422. The ball radius for the ball under examination is recorded at 424, and subroutine 386 examines whether there are more balls in the group at 402. If there are more balls in the group, subroutine 386 goes back to 398 and the process continues. If all balls have been examined at 402, then subroutine 386 normalizes the group confidence using the total number of balls originally in the group as shown at 404. Subroutine 386 also normalizes the group radius using the total number of balls in the remaining group at 408. The best ball group is recorded at 174. Subroutine 386 ends at 426.

Figure 15:
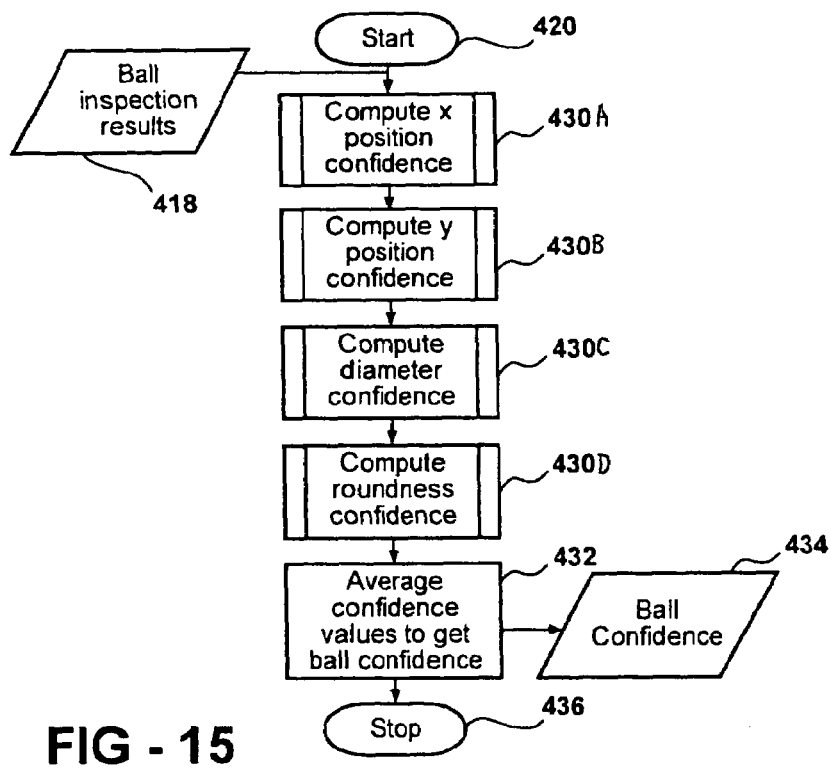
FIG. 15 is a flow chart illustrating a compute ball confidence for the first embodiment in the context of training a ball grid array.

As described above, a confidence for each ball in the model is calculated and recorded at 422. The ball confidence is reflected by subroutine 420 and relates to how closely the ball is to the expected location with the expected radius and how round the ball is. Subroutine 420 is illustrated in FIG. 15. FIG. 15 utilizes the ball inspection results from 418 to compute the X position confidence, 430A, the Y position confidence 430B, the diameter confidence 430C and the roundness confidence 430D. These confidence values are averaged at 432 to provide a ball confidence at 434. Subroutine 420 ends at 436. It is understood by people of skill in the art that a wide variety of techniques may be used to compute the confidences referenced at 430A–D.

Figure 16:
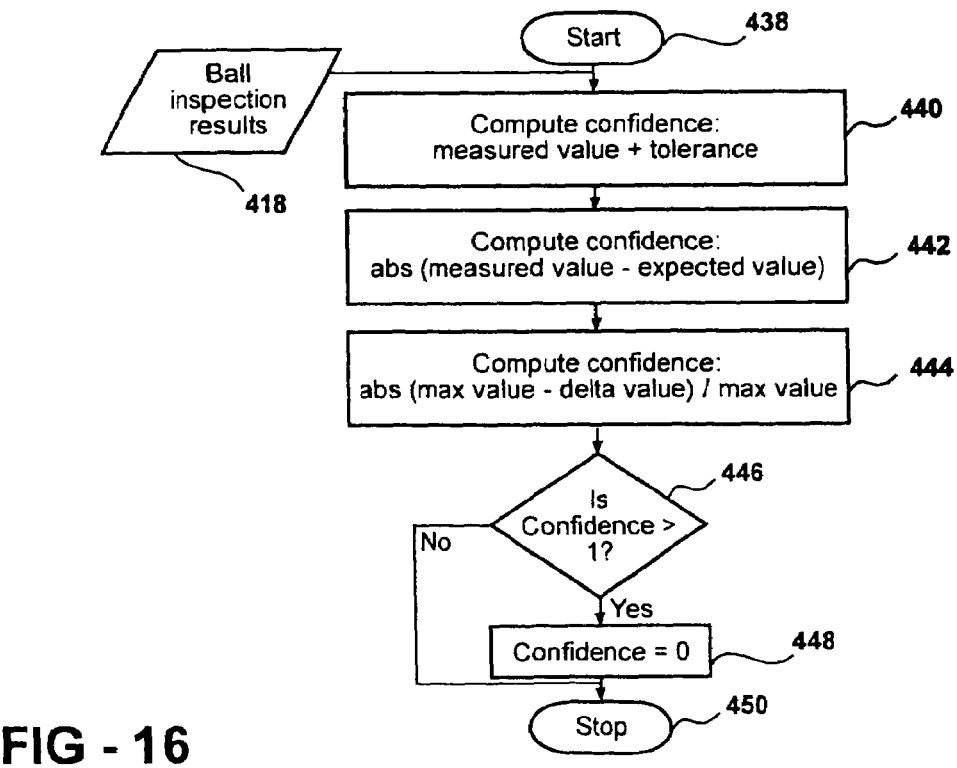
FIG. 16 is a flow chart illustrating a compute confidence function of the first embodiment in the context of training a ball grid array.

FIG. 16 illustrates a subroutine 438 to calculate overall confidence. The overall part model confidence is simply the sum of all the ball confidences divided by the number of balls originally in the part model prior to the quality check. This in essence gives a percentage of how many balls are out of round. In an alternate embodiment the best ball group may be used to select a part model from a library of known part models. More specifically, subroutine 438 may use the inspection ball results for a team to accomplish this task. At 440 the maximum allowed value is computed. The maximum allowed value is set to be the expected value plus the tolerance. A delta or difference value is computed at 442. The delta value is set to be the absolute value of the difference between the measured value and the expected value. At 444 the confidence is computed. The confidence is the absolute value of the difference between the maximum value and the delta value divided by the maximum value. If the confidence value exceeds one at 446 it is set to zero at 448 as that is an erroneous data point. Subroutine 438 ends at 450.

II. AUTO TEACHING ACCORDING TO THE SECOND PREFERRED EMBODIMENT IN THE CONTEXT OF A LEADED PART MODEL

In the second preferred embodiment the present invention utilizes a systematic approach, as opposed to trial and error, to locate and characterize the distinguishing features of the semi-conductor device being trained. The second preferred embodiment is described in the context of creating a part model for a leaded semiconductor component. A leaded semiconductor component includes a plurality of wires, called leads, extending from its periphery.

Like the first preferred embodiment, the second preferred embodiment is used to create a part model. The part model is then later used, for example, in a pick and place machine to locate semi-conductor devices represented by the part model. In the second preferred embodiment, for example, the user identifies for the system that a model of a leaded component is to be created. The system then makes assumptions regarding the configuration of the leaded part for which it is creating a model. For ease of description these assumptions may include the following. For a leaded component it may be assumed that the part includes multiple lead groups arranged in a substantially rectangular configuration. As such the lead groups may include one of four orientations, east, west, north and south (90, 180, 0 and 270 degrees respectively). It may also be assumed that each lead group has a set of evenly spaced leads that have an identical pitch, foot length (how long the lead is in two dimensions) and lead width. Further, for a leaded component it may be assumed that if there are multiple lead groups with the same orientation, that those lead groups would have identical pitch, foot length and lead width.

It is understood that the method of the second preferred embodiment of the present invention may have different assumptions if a different type of semiconductor device is being evaluated. For example if a part model for a BGA component was being created it may be assumed that a group of balls is present within the outer boundaries of the device and that the balls define an orthogonal array.

Figure 17:
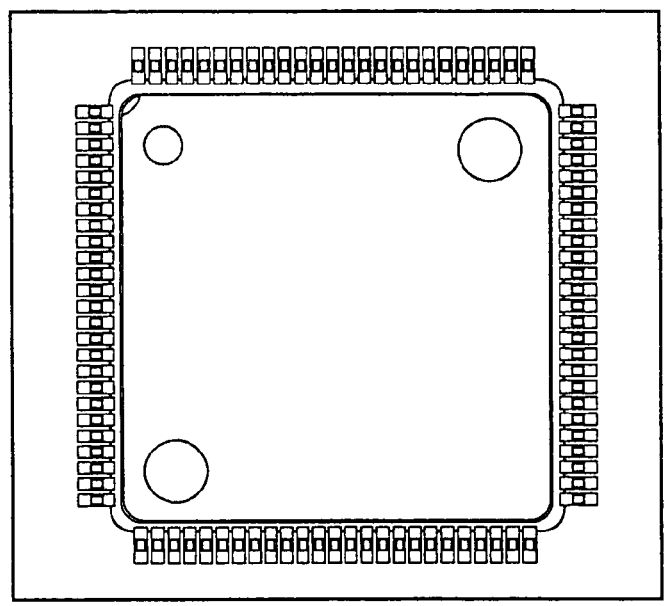
FIG. 17 is an illustration of a leaded semi-conductor component.
Figure 18:
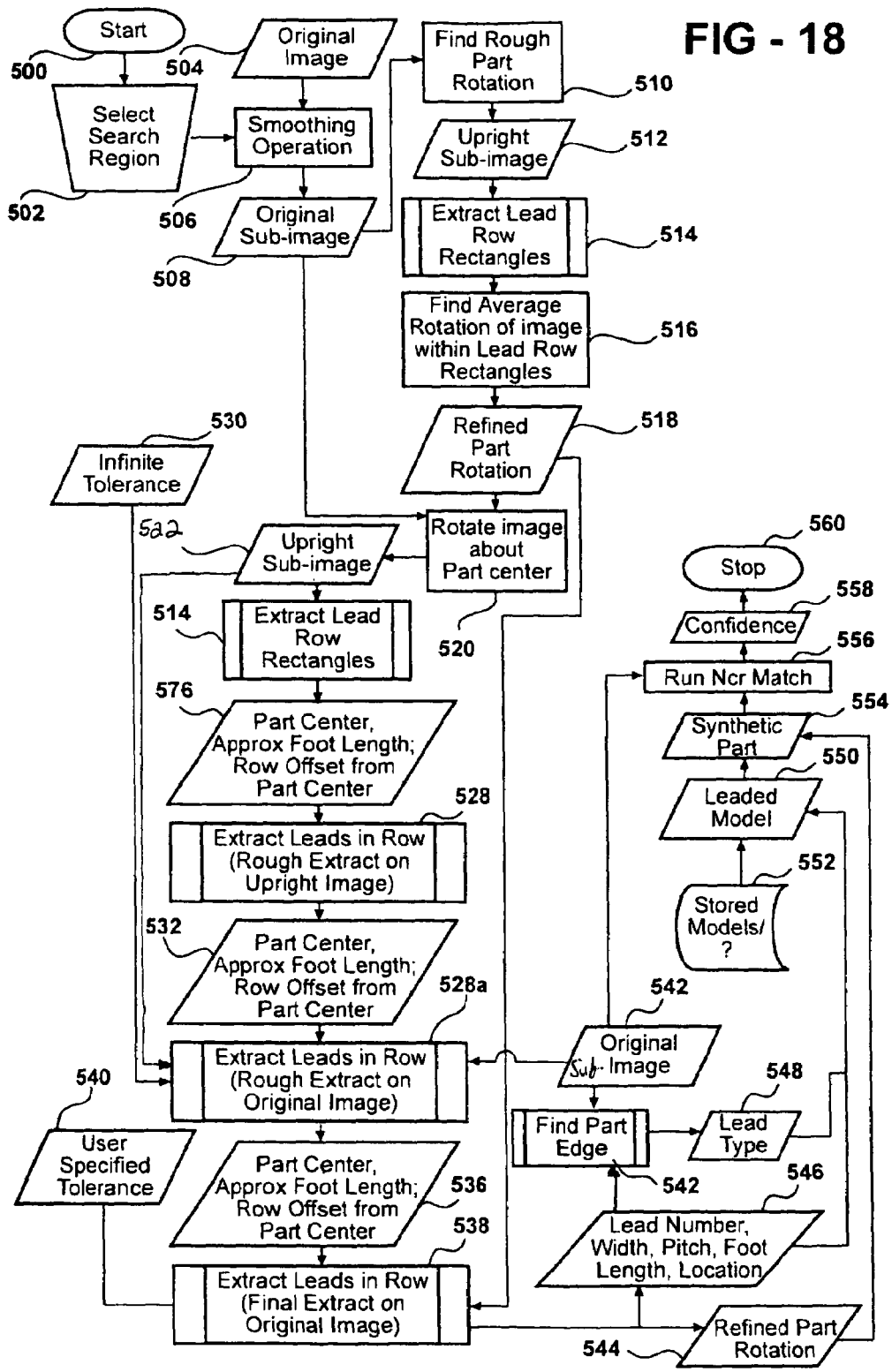
FIG. 18 is a flow chart illustrating the second embodiment in the context of teaching a leaded semi-conductor component.

With reference to FIG. 17 there is shown a typical image of a leaded component for which a model is being created. FIG. 18 illustrates a flow chart of the algorithm used to create a model for a leaded component. As shown the process starts at 500, where a user provides an example of a leaded component for which a part model is created or an image of such a component as referenced at 504. The user selects the search window in which the system is expected to find the image for which the part model is to be created at 502. The system begins by smoothing the image at 506. Smoothing the image involves use of any of a number of well known filters to reduce noise in the image. The result of this smoothing operation is coined the original sub-image as referenced at 508.

A rough part rotation is found at 510. The rough part rotation provides an angle from which the part deviates from being vertically oriented. One preferred manner to determine the rotation of the part is by running gradients along both the X and Y axes. Knowing the rough rotation of the image, the system can rotate the image through that angle to create a somewhat upright image at 512. As described herein, the preferred manner of the second preferred embodiment involves recalculating and refining the part rotation and determining relevant information based thereon.

Figure 20:
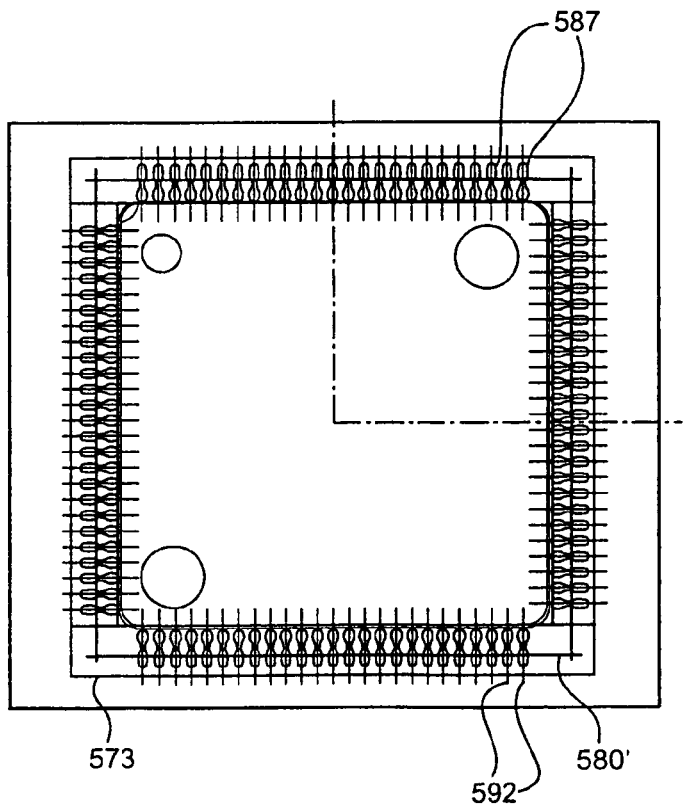
FIG. 20 is an illustration of the application of rulers and rectangles in the second embodiment in the context of training a leaded semi-conductor component.

The second preferred embodiment then applies subroutine 514 to extract lead row rectangles. The lead row rectangles describe rectangular regions that surround individual lead rows. Subroutine 514 is further illustrated in FIG. 19. Subroutine applies a corner filter 564 to upright image 512. The preferred corner filter is a median filter, which isolates the leads from other bright objects that may be present in the image. It is understood that other corner filters may be used. This operation yields a corner intensity image referenced at 566. At 568 a pair of concentric rectangles is fitted to the corner intensity image. The rectangles are fitted such that roughly 99% of the total image intensity is contained therein. The rectangles are preferably used as the new search window to locate the lead groups. The part center is recorded at 570 to be the center of the rectangles. The search region is split up into four rectangular sub-regions corresponding to the four lead rows at 572. With reference to FIG. 20, this is best illustrated by reference number 573. At 576 the part center is recorded together with an approximate foot length and a row offset from the part center. The approximate foot length at this time is the width of each rectangle, and the row offset is the distance from the row centerline to the part center.

Figure 19:
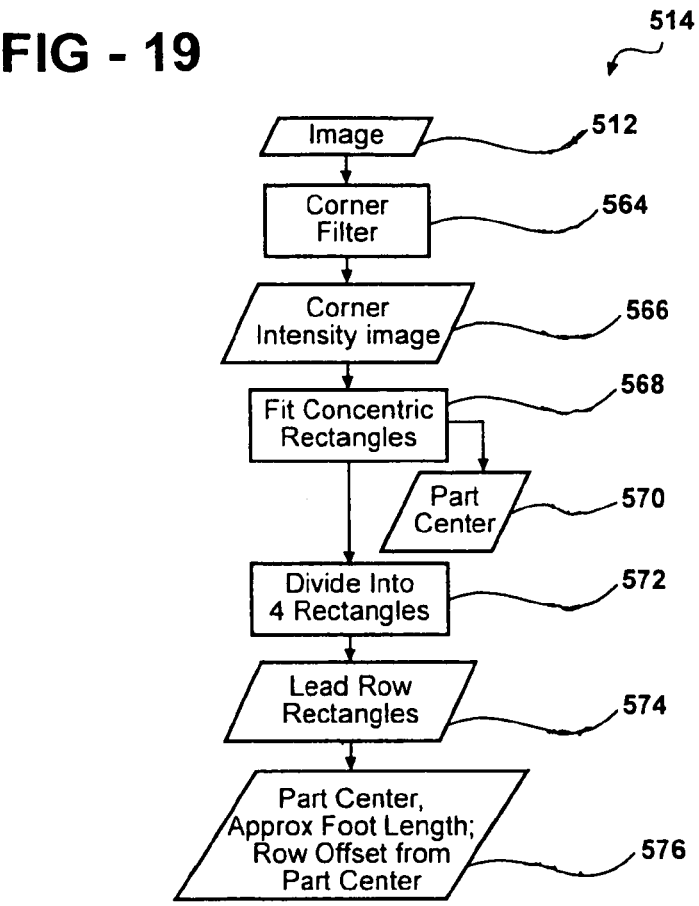
FIG. 19 is a flow chart illustrating the extraction of lead row rectangles for the second embodiment in the context of training a leaded semi-conductor component.

With reference again to FIG. 18, at 516 the system calculates an average rotation of the images within the lead row rectangles, recorded at 574 in FIG. 19. This provides a more accurate part rotation, which is recorded at 518. Preferably projection gradients are used to calculate this refined angle, and the original sub-image at 508 is rotated again at 520 using the angle recorded at 518 from the refined part rotation operation. This yields a new upright sub-image, which is recorded at 522. The new upright sub-image recorded at 522 is a more accurate representation of the original sub-image in an upright orientation. The above-described aspect of the preferred embodiment, while not absolutely required, provides an iterative method that improves the accuracy of the part model. The system then again runs subroutine 514 as discussed above and calculates a more accurate part center, approximate foot length and row offset from the part center. These new values are recorded at 576 in place of the earlier calculated values.

Figure 21:
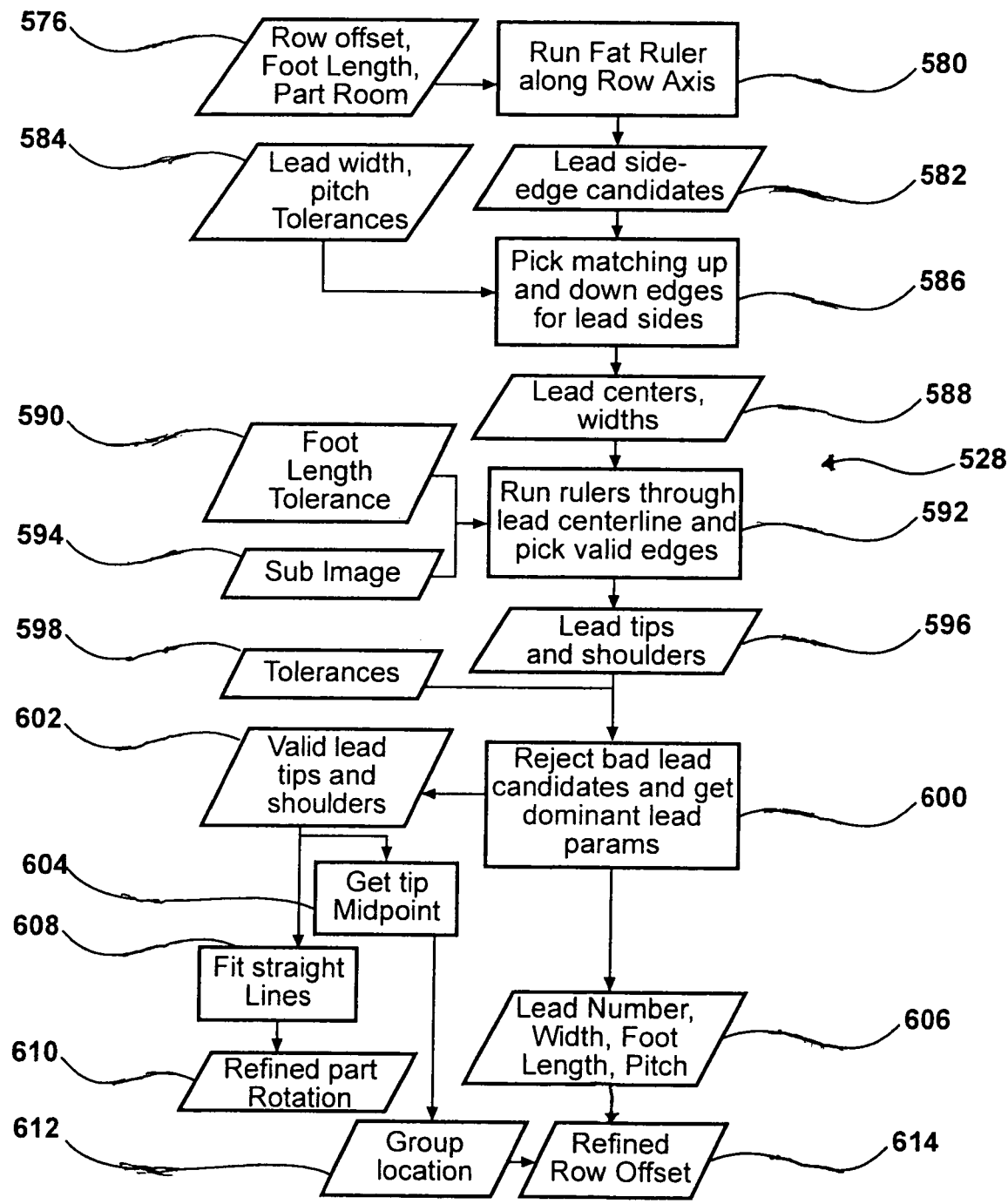
FIG. 21 is a flow chart illustrating extraction of leads in a row for the second embodiment in the context of training a leaded semi-conductor component.

Subroutine 528 performs a rough extract of leads from upright sub-image 522. Subroutine 528 is illustrated in more detail in FIG. 21. Using the row offset, foot length and part rotation calculated and recorded earlier, at 576 and 518, subroutine 528 runs a fat ruler at 580, along each row axis at 580. These rulers at 580 are coined "fat" because of their width. The fat rulers are graphically illustrated by reference numeral 580' in FIG. 20. The results from the fat ruler operation are lead side edge candidates as referenced at 582. Using lead width and lead pitch tolerances, set by the user, subroutine 528 picks matching up and down edges to identify the sides of each lead as referenced at 586. Up and down edges are deemed to be matching when they satisfy the assumptions made regarding the leaded component. These corresponding up and down edges are best seen in FIG. 20 as referenced by 587. Identification and selection of these corresponding up and down edges allows subroutine 528 to calculate the lead centers and lead widths as shown at 588. Knowing the lead centers, subroutine 528 can then use rulers, at 592, along the center line of each lead, i.e., perpendicular to fat ruler 580, to extract the tip and shoulder locations for each lead as referenced at 596. This process is done for each lead group, referenced as a sub-image 594.

The above described process results in a group of edges for which there is a high probability that the edges correspond to leads. However, the preferred embodiment provides additional processing to reject edges that do not correspond to leads. The dominant parameters of the edge data are extracted at 600 by applying histograms to the individual lead parameters. That is, and for example, the histogram analysis will yield the dominant lead widths and foot lengths. At 600, although not specifically referenced, the edges may be reclassified into leads based on determining whether up and down edges match using the dominant parameters. From the new set of leads calculated at 600, the locations of the lead tips and lead shoulders are calculated and assumed to be valid. This yields the valid lead tips and shoulders recorded at 602. Using this information, the midpoint of each lead tip can be derived at 604, together with a group location recorded at 612 and a refined row offset from the center calculated and recorded at 614. The group location provides information about multiple lead groups in situations where there is a gap in the lead row.

Straight lines are fitted at 608 to the lead tips and shoulders for each lead in a lead row to determine a refined part rotation 610. Fitting straight lines through this collection of data provides a more precise indication of where the part is and thus yields a better part rotation. Application of subroutine 528 on the upright image as described above results in a rough part model. The part model is considered rough because the lead information is derived from a rotated image.

With reference again to FIG. 18, the preferred embodiment performs additional processing to improve to location of the leads. While not necessary, this additional processing increases the accuracy of part model. In particular, using the part center, approximate foot length and row offset from part center at 532 as calculated by subroutine 528, the search window is rotated and subroutine 528 is applied to the original sub-image at 508, as referenced by 528a. This provides an improved calculation of the part center, foot length and, row offset from part center, as referenced at 536. Using these refined row offsets and foot lengths another set of corner points may be established, which can be used to reestablish lead rows for the original, un-rotated image. The extract leads subroutine 528 may be again applied using these refined information to provide information about the leaded component. In the preferred embodiment, no further processing is done on the image to refine the location of the leads in the image.

This information provides a refined part rotation at 544, and the lead number, lead width, pitch, foot length and location at 546, which are included in the definition of the model at 550. It is understood however that subroutine 528 may be performed any number of times and the row-offset, foot length and part rotation can be repeatedly calculated and used to more accurately determine, e.g., the icad, number, foot length, width pitch group location and refined offsets.

The automatic teaching of a leaded component also includes a classification of the type of lead, typically a J lead or a Gull Wing lead. To classify the lead, the system first finds the edges of the part. The edges of the part are found and the lead is classified using subroutine 542.

Figure 22:
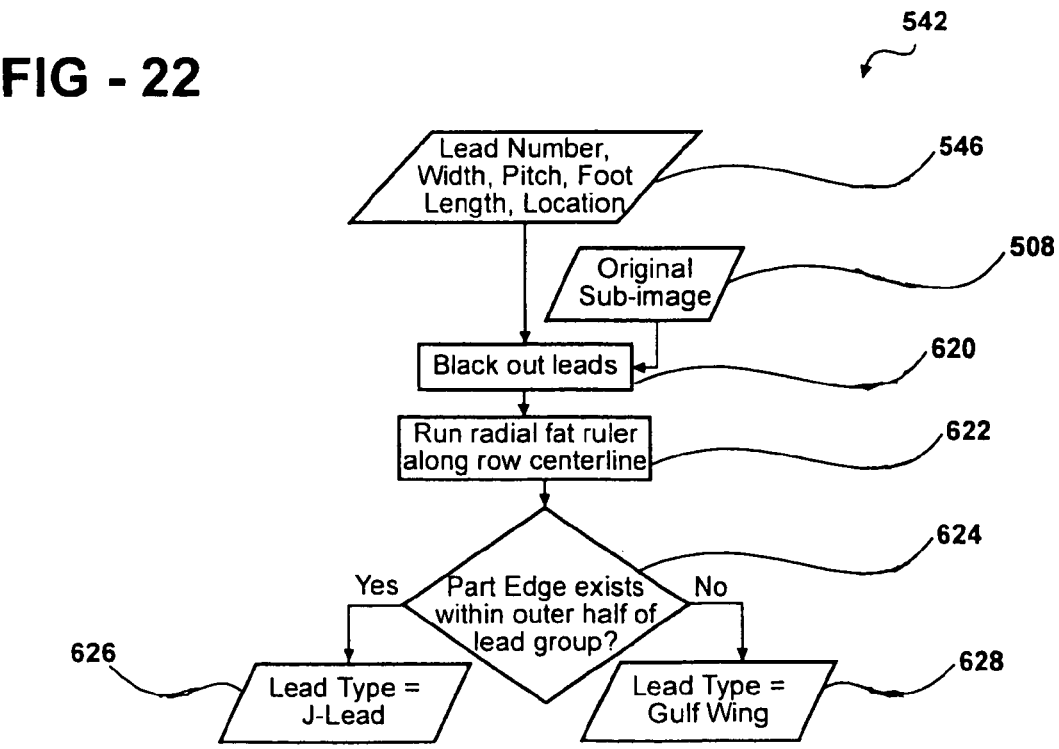
FIG. 22 is a flow chart illustrating the step of defining a part edge for the second embodiment in the context of training a leaded semi-conductor component.

With reference to FIG. 22, subroutine 542 is described in greater detail. Using the particular information about the leaded component, i.e., the lead number, lead width, pitch, foot length and location from 546, the leads in original sub-image 508 are blacked out at 620. A radial fat ruler is run along the centerline of each lead row at 622. Subroutine 542 queries at 624 as to whether part edges exist within the outer half of the lead groups. If the answer is yes then the leads are classified as J-leads at 626, and if the answer is no the leads are classified as Gull Wing leads at 628. The lead type is reported at 548, and the lead model is reported at 550.

The leaded part model 550, may be a function of stored models 552. These models may represent more repeatable models for any given semiconductor. After the leaded part model is defined and recorded at 550, the system may search a database of known part models to determine which known part model best corresponds to the taught part model.

A confidence may also be calculated for the model. The confidence is preferably calculated by running a normalized correlation between the model and the upright image within the search region, as referenced at 556. It has been determined that the correlation coefficient accurately represents the confidence in the model at 558.

As above described, the creation of a part model using the second preferred embodiment makes assumptions concerning the type of semiconductor being trained and then systematically narrows in on the appropriated image data to accurately describe the semi-conductor. As described above, the second preferred embodiment involves iteratively refining the rotation of the part to provide greater definition and higher speed to the location of orthogonal leads.

III. AUTOTEACH ACCORDING TO THE THIRD PREFERRED EMBODIMENT IN THE CONTEXT OF CREATING A PART MODEL OF AN ODD FORM SHAPE

The present invention also provides a third preferred embodiment for automatically training. The third preferred embodiment involves creating unique signatures associated with the shapes of interest. Like the automatic teaching techniques described above, and in the context of an odd form shape, a user simply designates that the shape to be trained is an odd form and the system chooses the best part model corresponding to that shape. The system includes a library of predefined shapes from which a part model can be created. In the third preferred embodiment these predefined shapes include ellipses, circles, rectangles, squares, triangles, diamonds, double squares, crosses, double crosses, quarter circles, double quarter circles and custom defined shapes.

In operation the system is provided with an image of an object for which a part model is to be created. In general, the automatic teaching technique of the third preferred embodiment is divided into two main phases. The first phase is a feature extraction phase in which features are extracted from the image. The second phase is a template matching phase where the system matches the features to known templates of predefined shapes. Once a match is made the model can be defined.

Figure 23:
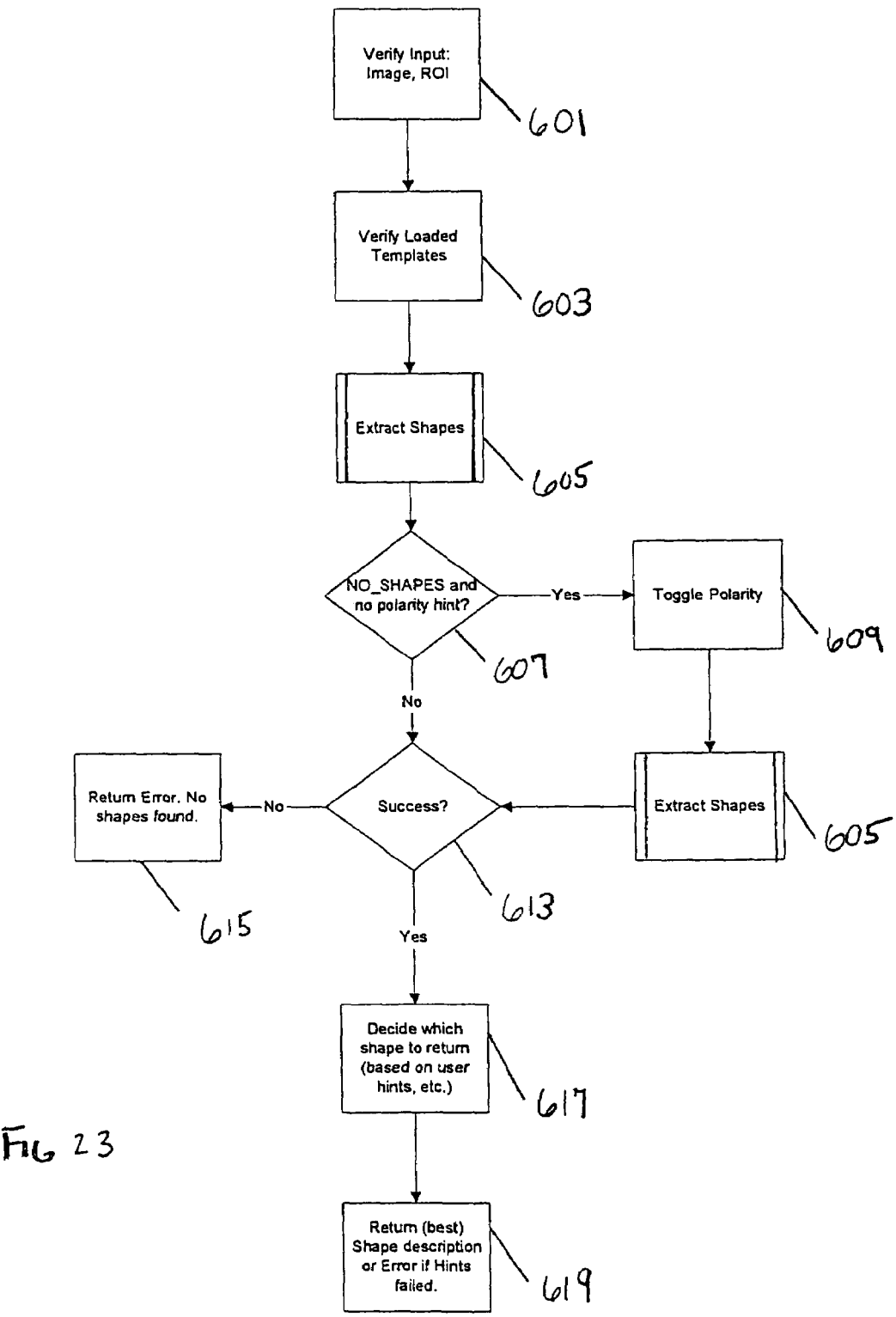
FIG. 23 is a top-level flow chart of the third embodiment illustrating an automated teaching technique for an odd form shape.

With reference to FIG. 23 there is shown a flow chart for an automatic teaching technique in the context of training an odd form fiducial shape. At 601, the user has identified that an odd form shape is to be trained, and the system verifies that an image has been input. A region of interest, or ROI, is also designated. The ROI describes that location within the image frame in which the odd form shape is expected to be found. At 603 the system verifies that the templates of the predefined shapes have been loaded into the system.

Figure 23A:
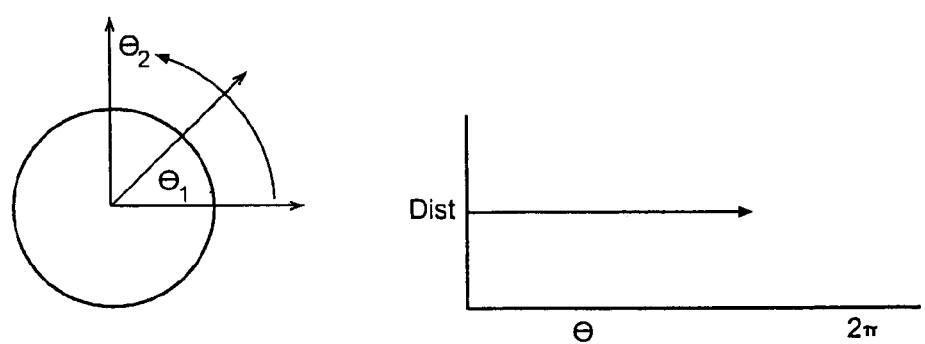
FIG. 23A illustrates signatures for a square and a circle according to the third embodiment.
Figure 23A:
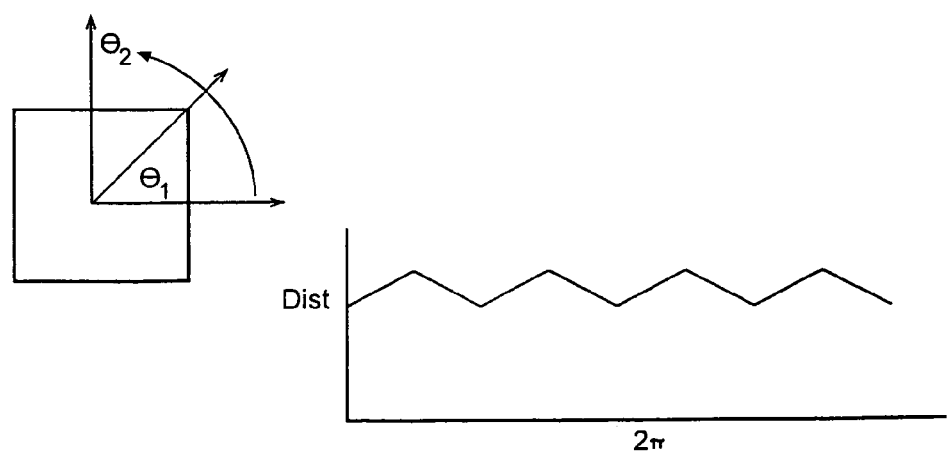

The templates of the predefined shapes are characterized by a collection of unique signatures. These unique signatures are derived by taking the radial distance from the center of the shape. With reference to FIG. 23A there is shown a signature for a circle, and a square respectively. As is self evident from the figure, each shape includes a different signature.

Figure 24:
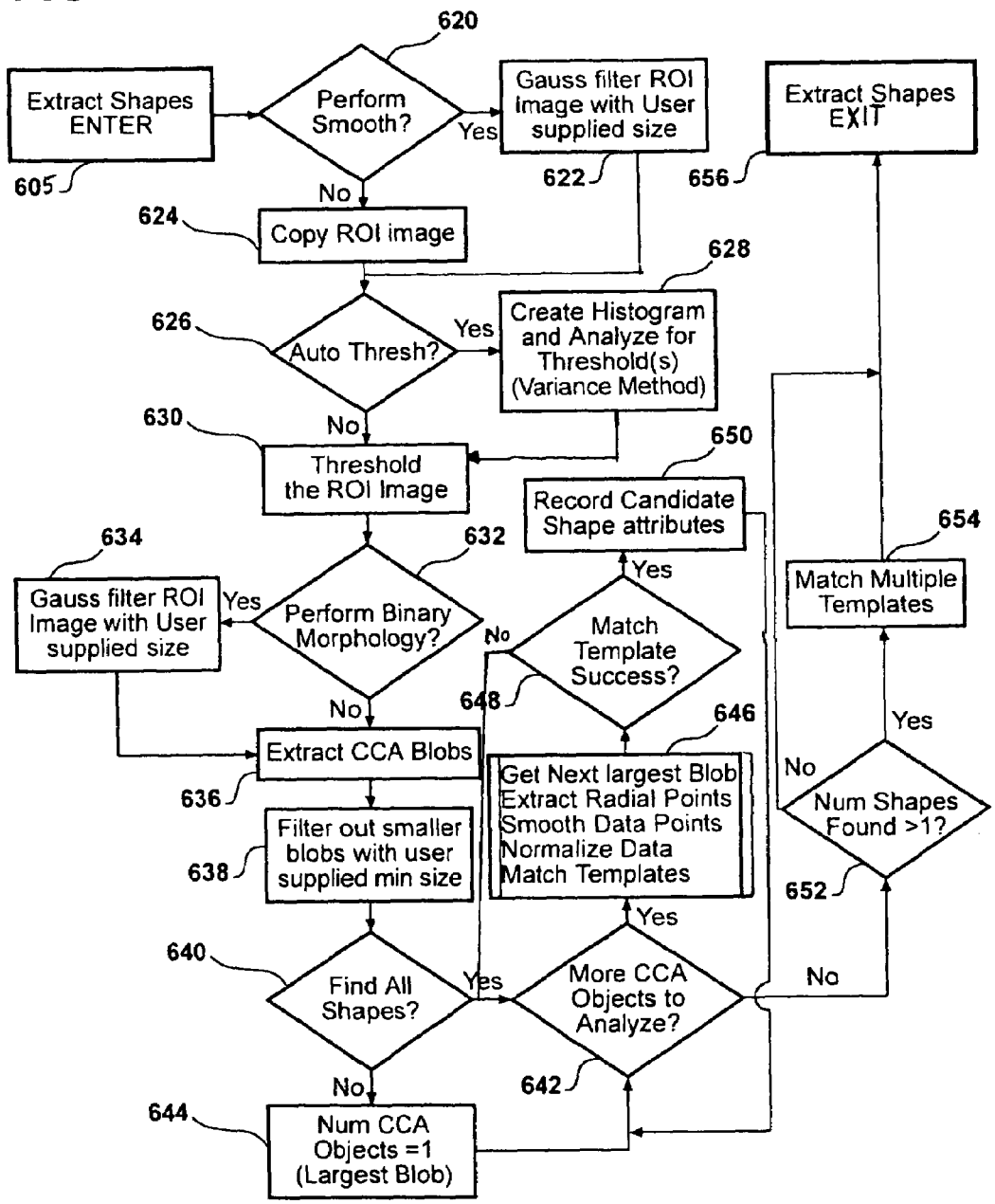
FIG. 24 is a flow chart illustrating the extraction of shapes of the third embodiment.

At subroutine 605 shapes are extracted from the image input previously at 601. With reference to FIG. 24, subroutine 605 is illustrated in greater detail. At 620, subroutine 605 determines whether the image should be smoothed. In the preferred embodiment the provided image is smoothed in each instance. However, a user may choose to deactivate this function. As indicated at 622, if a decision to smooth has been made a Gauss filter is applied to the image within the ROI. It is understood that other smooth functions may be applied. If the smooth function has been deactivated, then the ROI image is merely copied at 624.

Subroutine 605 next considers whether an auto-threshold operation is appropriate. Again, in the preferred embodiment subroutine 605 will auto threshold the image. However, a user may determine that a particular threshold value provides improved results, in which case the user can deactivate the auto threshold and/or substitute a value. As shown at 628, to perform the auto threshold, a histogram is created and is analyzed for the appropriate threshold. The histogram provides the dominant parameters of the image from which a thresholding operation may be performed. The auto threshold is preferably done using a variance method, although people of skill in the art will recognize that other methods are also available. Once the threshold value is chosen at 628 it is applied at 630. If an auto-threshold has not been designated at 626, then a user selected threshold is applied at 630. The threshold creates a binary image.

At 632 the system inquires as to whether binary morphology is appropriate. In the third preferred embodiment subroutine 605 will by default apply binary morphology, unless the function has been deactivated by the user. If binary morphology is appropriate subroutine 605 applies a binary closed filter at 634 with a size either set as a default or supplied by the user. Preferably this size is input prior to use. The result of the binary filter operates to clarify the image.

After the above described preprocessing, subroutine extracts CCA blobs at 636 through a connected component analysis (CCA). Connected component analysis is a known encoding transformation that provides an ability to extract blobs of a predefined size and/or extract other features, thus combining an extraction operation with a filtering operation. The connected component analysis involves filtering blobs that do not meet predefined criteria. In this case the criteria is based on a minimum size as noted at 638. Persons of ordinary skill in the art would recognize that criteria other than size may be used to filter out blobs.

At 640, subroutine 605 queries as to whether all shapes have been found. If no more shapes have been found the largest blob is the CCA object as referenced at 644, and subroutine 605 queries as to whether more CCA objects require analysis at 642. If more CCA objects are available subroutine 605 immediately queries as to whether more CCA objects require analysis at 642. If CCA objects have not been analyzed, then subroutine 646 is applied.

Figure 25:
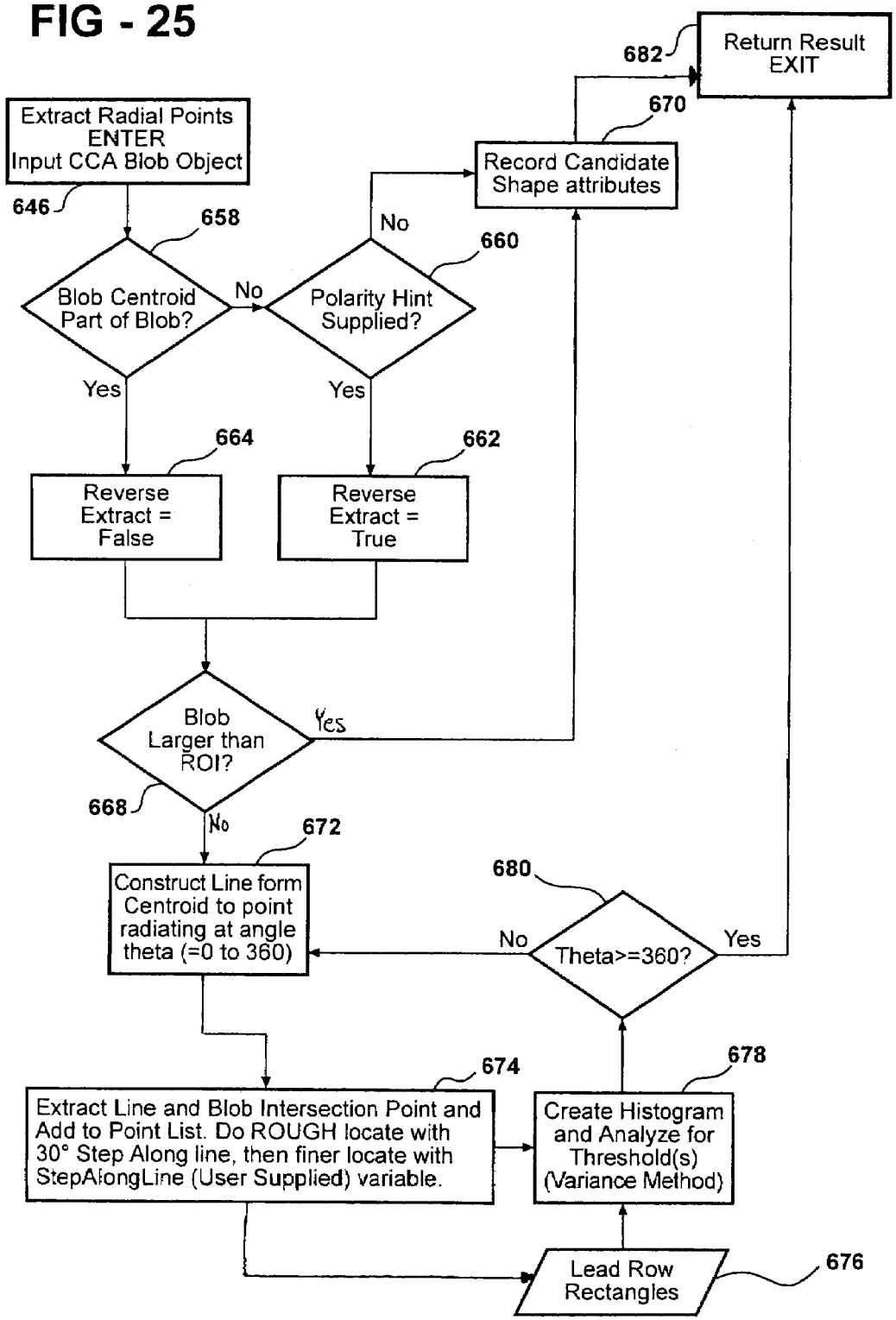
FIG. 25 is a flow chart illustrating the extraction of radial points of the third embodiment.

Subroutine 646 extracts radial points and creates a unique signature corresponding to the CCA object. This signature is of the same type as those illustrated in FIG. 23A. The signature of the CCA object can be normalized and compared to signatures corresponding to the library of pre-defined shapes, thus establishing a shape for the part model. With reference to FIG. 25, subroutine 646 is described in greater detail.

As noted in the FIG. 25, the input for subroutine 646 is the CCA object. As used in FIG. 25, the term blob is the same as the term CCA object. Subroutine 646 queries as to whether the blob centroid is part of the blob at 658. If it is not, subroutine 646 determines if any polarity hints have been provided at 660. These polarity hints may be user supplied, or may be provided by defaults. The polarity hints are optional. The polarity hints may include an identification that the shape is a double square. If no hints are provided subroutine 646 indicates a failure at 670 and exits at 682. If hints are supplied, then subroutine 646 sets a Reverse Extract variable to be true at 662. This reverses the polarity of the image. If the blob centroid is part of the blob at 658, the Reverse Extract variable is set to be false at 664. As will be described, if the reverse extract is false, the signature is calculated from the centroid of the blob outwards, and if the reverse extract is true then the signature is created from a point outside the CCA object and goes toward the centroid.

Subroutine 646 also determines whether the blob is larger than the ROI at 668. If the blob is larger than the ROI then subroutine 646 fails at 670 and exits at 682.

If the blob is smaller than the ROI at 668, the subroutine 646 constructs a line from the centroid of the blob to a point radiating at an angle theta as shown at 672. At 674 the point at which the line intersects the blob is added to a point list. As noted at 674, the line used to extract the point may be rough or fine. This is noted by the "Step Along Line" variable. This variable may also be user provided and as appreciated related to the accuracy at which the intersection of the line and blob is calculated. As referenced at 676, 678 and 680, subroutine 646 loops through 360 degrees incrementing either at a user incremented value or a default value. The default value is set to be 1 degree. This process results in a list of points. Subroutine 646 then returns a list of points as referenced at 682.

Figure 26A:
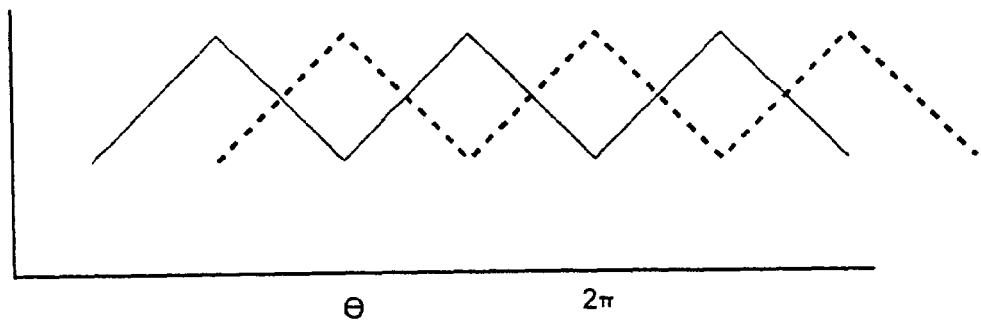
FIGS. 26A and 26B illustrate the manner in which signatures may be matched for corresponding shapes of the third embodiment.
Figure 26B:
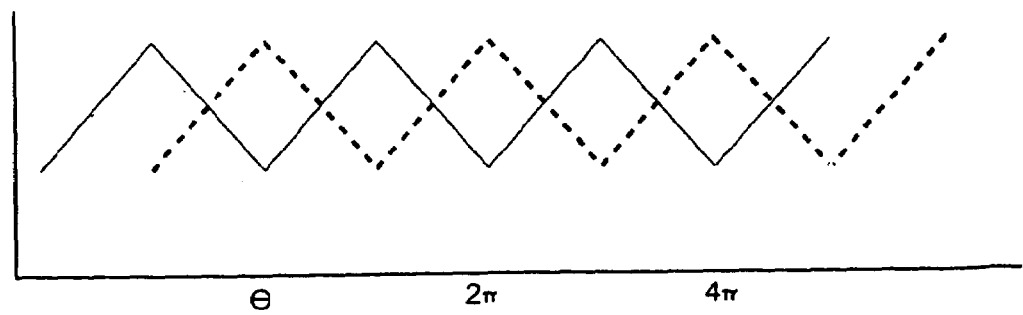

With reference again to FIG. 24, the points can be smoothed and normalized for matching against the defined shapes as referenced in 646. Reference 646 also notes that the extracted radial points are matched against the templates. With reference to FIGS. 26A and B it is shown how a template may be radially shifted over the extracted radial points to attempt a match. As illustrated the dashed line represents the extracted signature while the solid line represents the template.

If the template match is not a success, as referenced at 648, the system determines if more CCA objects require analysis. Thus, the third preferred embodiment tries to match all of the CCA blobs to a template. At 652 the system queries as to whether the number of shapes found exceeds 1. If only 1 template matched a shape that shape corresponds to the part model for the fiducial. If multiple shapes are found then an indication of multiple templates is provided at 654, and the results are returned at 656.

With reference again to FIG. 23, the remainder of the third preferred embodiment is illustrated. In 607, if a failure occurred because no polarity hints were provided, the system may toggle the polarity at 609 and reapply subroutine 605. This may result in a successful match at 613. The system then returns the best result at 617 and 619 as indicated. If neither polarity resulted in a match the system then returns an error at 615.

In this way the third preferred embodiment creates unique signatures for each shape to be trained. These unique signatures can be matched against CCA objects extracted from the image being trained. It has been found that the third preferred embodiment is extremely fast and robust.

Lighting

For any of the first through third preferred embodiments, the lighting used may be automatically selected. One manner is by maximizing a lighting score or $L_{REPORTED}$, reported through the 0x0D "Lighting Score" command and is preferably computed as follows:

$$L_{REPORTED} = 10{,}000 \times L$$

where the fundamental lighting score, L, which varies from 0.0 to 1.0, is computed as follows:

$$L = (V \times S)/V_{max}$$

As shown above, V is the "variance normalized distance" between the grayscale means of the distributions associated with the "foreground" and the "background" in the image window. Thus, an equation for V may be expressed as follows:

$$V = |M_F - M_B|/\sqrt{(\sigma^2_F + \sigma^2_B)}$$

As used herein, the variable $M_F$ is the mean grayscale value of the foreground pixels; the variable $M_B$ is the mean grayscale value of the background pixels; the variable $\sigma^2_F$ is the variance of the grayscale values of the foreground pixels about their mean; and the variable $\sigma^2_B$ is the variance of the grayscale values of the background pixels about their mean. It should be noted that the variance values are not allowed to take on values of less than 1.0.

As shown above, in calculating the fundamental lighting score L, S is the "saturation factor," which is the product of the two distributions' fractions of pixels whose grayscale values are not at the combined distribution minimum and maximum values. An equation for S may be expressed as follows:

$$S = S_F \times S_B$$

As used the variable $S_F$ is the fraction of the foreground pixels whose grayscale values are not at the low or high saturation values, and the variable $S_B$ is the fraction of background pixels whose grayscale values are not at the low or high saturation values.

As shown above, in calculating the fundamental lighting score L, $V_{max}$ is the "maximum possible variance normalized distance," which takes into consideration the saturation factor reduction. An equation for $V_{max}$ may be expressed as follows:

$$V_{max} = ((G_{max} - 1) - (G_{min} + 1))/\sqrt{2}$$

As used, the variable $G_{max}$ is the maximum grayscale achievable during digitization (e.g., 255), and the variable $G_{min}$ is the minimum grayscale achievable during digitization (e.g., 0).

It is understood that because the lighting score is heavily dependent upon the variances of the foreground and background pixel grayscale distributions, the lighting score is very scene-dependent. When comparing the lighting score from two different images, therefore, lighting itself should be the only variable While the invention has been described with reference to specific methods it is understood that each of these methods may be encoded on a computer readable storage medium such as a CD-ROM. Further it is understood that each of the methods is not limited to automatically defining a part model of the type described. For example, it is understood that certain ball grid array type components may be defined using the systematic approached described in the context of a leaded semiconductor or conversely the trial and error approach described in the context of a ball grid array may be used to define a part model for a leaded semiconductor. It is further understood that as semi-conductor technology moves forward additional types of components may be developed. The instant methods of defining a part model may have applicability in defining part models for these yet to be developed components. Thus, the present invention is not limited by the specification, but rather the claims.

What is claimed is:

1. A method for automatically defining a part model for a semiconductor component comprising:
   providing an image of a part model wherein the image of the part model is an image of a ball grid array;
   selecting the type of part model to be defined, wherein the type of part model is selected to be a ball grid array;
   a step for automatically defining the part model wherein the step for automatically defining the part model further comprises:
      selecting a plurality of arbitrary radii;
      looping over the radii and finding a plurality of cues based on each radii;
      sorting the plurality of cues associated with each radii into groups to create a plurality of ball groups; and
      selecting the best group from the set of ball groups; and
   recording the part model.

2. A method as in claim 1 wherein the ball groups are created from the cues by finding a plurality of right and left hand neighbors of the cues, finding a straight line distance between the cues, finding an angle between the cues to determine an X pitch and a Y pitch and recording the X pitch and Y pitch.

3. A method for automatically defining a part model for a semiconductor component comprising:
   providing an image of a part model wherein the image of the part model is an image of a leaded component, the leaded component including a number of leads having a defined pitch, each lead having a defined location;
   selecting the type of part model to be defined wherein the type of part model is selected to be a leaded component;
   a step for automatically defining the part model wherein the step for automatically defining the part model further comprises:
      extracting at least one lead row rectangle from the image; and
      determining the number of leads, their location and pitch from the lead row rectangles whereby the part model is defined by the number of leads, their location and pitch; and
   recording the part model.

4. A method as in claim 3 wherein the image of the leaded component is rotated prior to extracting lead row rectangles.

5. A method for automatically defining a part model for a semiconductor component comprising:
   providing an image of a part model wherein the image of the part model is an image of an odd form component;
   selecting the type of part model to be defined wherein the type of part model is selected to be an odd form component;
   a step for automatically defining the part model wherein the step for automatically defining the part model further comprises:
      providing a plurality of templates, the templates including a collection of points defined by a distance and an angle value;
      extracting a blob from the image of the part model;
      extracting a plurality of points from the blob, the plurality of points defined by a distance and an angle value;
      comparing the plurality of points extracted from the blob against the plurality of templates; and
      determining which template best corresponds to the plurality of points extracted from the blob; and
   recording the part model.

6. A method of defining a part model for a semiconductor component comprising:
   providing an image of the component wherein the component includes geometric features which have specific dimensions;
   looping through a plurality of dimensions that may correspond to the specific dimensions in the image of the component wherein the plurality of dimensions includes a plurality of radii, each of the plurality of radii having a different value,
   determining a score for each of the plurality of dimensions; and
   selecting one of the dimensions to define the part model as a function of the scores wherein the semiconductor is a ball grid array defined by a plurality of balls, the collection of balls defined by a single radius, and wherein the plurality of radii is used to find a plurality of cues.

7. A method as in claim 6 wherein the cues are sorted based on horizontal positions.

8. A method as in claim 7 further comprising creating a parameter space image, growing groups of balls, storing a largest ball group for each radius, and computing the score for each radius.

9. A method as in claim 8 wherein the part model is compared to a library of part models and a part model is selected from the library of part models based on the comparison between the part model derived from the image and the library of part models.

10. A method as in claim 8 wherein the part model is stored and used to locate ball grid arrays.

11. A method of defining a part model for a semiconductor component comprising:
    providing an image of a component wherein the component includes unique geometric features which are arranged in the image in a pattern defined by a size and pitch;
    extracting the unique geometric features from the image;
    determining the size and pitch of the geometric features in the image; and
    defining the part model based on the size and pitch of the geometric features in the image.

12. A method as in claim 11 wherein the semiconductor component is a leaded semiconductor defined by a plurality of leads, the leads including edges and a center location, the leads further including a number and a pitch, and the unique geometric features correspond to the number, pitch, and center of the leads, and wherein the image of the component is an image of a leaded semiconductor.

13. A method as in claim 12 further comprising:
extracting the edges of the leads; and
defining leads based on complimentary edges and determining the center locators based on the complementary edges.

14. A method as in claim 13 wherein the image of the semiconductor is rotated to a vertical orientation prior to extracting edges of the leads.

15. A method as in claim 14 wherein the edges of the leads are extracted from the original image based on the edges extracted from the rotated image.

16. A method of automatically defining a part model for a semiconductor component comprising:
providing an image of the semiconductor component wherein the image includes a distinct profile;
providing a plurality of test profiles where each profile is defined by a distance and angle value;
extracting a blob from the image of the semiconductor component;
extracting a plurality of points from the blob, the plurality of points defined by a distance and an angle value;
comparing the plurality of points extracted from the blob against the plurality of test profiles; and
determining which test profile best corresponds to the plurality of points extracted from the blob.

17. A method as in claim 16 wherein the semiconductor is an odd form part and the image of the semiconductor is an image of an odd form part.

18. A method as in claim 17 wherein the distance components extracted from the blob are normalized prior to comparing the plurality of points extracted from the blob against the plurality of test profiles.

19. An article of manufacture for a semiconductor component, comprising:
a computer readable medium bearing computer program code embodied therein for performing a task of defining a part model, and including:
means for acquiring an image of a part model wherein the image of the part model is an image of a ball grid array;
means for receiving a selection corresponding to the type of part model to be defined wherein the type of part model is selected to be a ball grid array;
means for automatically defining the part model wherein the means for automatically defining the part model further comprises:
means for selecting a plurality of arbitrary radii;
means for looping over the radii and finding a plurality of cues based on each radii;
means for sorting the plurality of cues associated with each radii into groups to create a plurality of ball groups; and
means for selecting the best group from the set of ball groups; and
means for recording the part model.

20. An article of manufacture in claim 19 wherein the means for looping over the radii to create ball groups further comprises means for finding right and left hand neighbors of the cues, means for finding the straight line distance between the cues, means for finding the angles between the cues and means for recording cue locations X pitch and Y pitch.

21. An article of manufacture for a semiconductor component, comprising:
a computer readable medium bearing computer program code embodied therein for performing a task of defining a part model, and including:
means for acquiring an image of a part model wherein the image of the part model is an image of a leaded component;
means for receiving a selection corresponding to the type of part model to be defined wherein the type of part model is selected to be a leaded component;
means for automatically defining the part model wherein the means for automatically defining the part model further comprises:
means for extracting lead row rectangles from the image; and
means for determining the number of leads their location and pitch from the lead row rectangles whereby the part model is defined by the number of leads, their location and pitch; and
means for recording the part model.

22. An article of manufacture for a semiconductor component, comprising:
a computer readable medium bearing computer program code embodied therein for performing a task of defining a part model, and including:
means for acquiring an image of a part model wherein the image of the part model is an image of an odd form component;
means for receiving a selection corresponding to the type of part model to be defined wherein the type of part model is selected to be a leaded component;
means for automatically defining the part model wherein the means for automatically defining the part model further comprises:
means for acquiring a plurality of templates, the templates including a collection of points defined by a distance and an angle component;
means for extracting a blob from the image of the part model;
means for extracting a plurality of points from the blob, the plurality of points defined by a distance and an angle component;
means for comparing the plurality of points extracted from the blob against the plurality of templates; and
means for determining which template best corresponds to the plurality of points extracted from the blob; and
means for recording the part model.

23. A computer readable storage medium containing software executable by a computer to perform process steps for automatically defining a part model for a semiconductor component wherein an image of the component is provided, the image including geometric features which have specific dimensions, the process steps comprising:
looping through a plurality of dimensions that may correspond to the specific dimensions in the image of the component wherein the plurality of dimensions includes a plurality of radii;
determining a score for each of the plurality of dimensions; and
selecting one of the dimensions to define the part model as a function of the scores, wherein the semiconductor is a ball grid array defined by a plurality of balls, the collection of balls defined by a single radius and wherein the plurality of radii is used to find a plurality of cues.

24. A computer readable storage medium as in claim 23 wherein the cues are sorted based on horizontal positions.

25. A computer readable storage medium as in claim 24 wherein the process steps further comprise creating a parameter space image, growing groups of balls, storing the largest ball group for each radius, and computing the score for each radius.

26. A computer readable storage medium as in claim 25 wherein the process steps further comprise comparing the part model to a library of part models and selecting a part model from the library of part models based on the comparison between the part model derived from the image and the library of part models.

27. A computer readable storage medium containing software executable by a computer to perform process steps for automatically defining a part model for a semiconductor component, wherein an image of the semiconductor component is provided, the image including unique geometric features which are arranged in the image in a pattern defined by a size and pitch, the process steps comprising:
    extracting the unique geometric features from the image;
    determining the size and pitch of the geometric features in the image; and
    defining the part model based on the size and pitch of the geometric features in the image.

28. A computer readable storage medium as in claim 27 wherein the semiconductor component is a leaded semiconductor defined by a plurality of leads, the leads including edges and a center, number and pitch, and the unique geometric features correspond the numbers pitch and center of the leads, and wherein the image of the component is an image of a leaded semiconductor.

29. A computer readable storage medium as in claim 28 wherein the process steps further comprise:
    extracting the edges of the leads; and
    defining leads based on complementary edges and determining the centers based on the complementary edges.

30. A computer readable storage medium as in claim 29 wherein the process steps further comprise rotating the image of the semiconductor to a vertical orientation prior to extracting edges of the leads.

31. A computer readable storage medium containing software executable by a computer to perform process steps to automatically define a part model for a semiconductor component comprising wherein an image, having a distinct profile, of the semiconductor component is provided and a plurality of test profiles are provided where each profile is defined by a distance and an angle component, the process steps comprising
    extracting a blob from the image of the semiconductor component;
    extracting a plurality of points from the blob, the plurality of points defined by a distance and an angle component;
    comparing the plurality of points extracted from the blob against the plurality of test profiles; and
    determining which test profile best corresponds to the plurality of points extracted from the blob.

32. A computer readable storage medium as in claim 31 wherein the semiconductor is an odd form part and the image of the semiconductor is an image of an odd form part.

33. A computer readable storage medium as in claim 32 wherein the process steps further comprise normalizing the distance components extracted from the blob prior to comparing the plurality of points extracted from the blob against the plurality of test profiles.

* * * * *